United States Patent
Dale et al.

(10) Patent No.: US 10,489,118 B2
(45) Date of Patent: *Nov. 26, 2019

(54) COLLECTING ENTROPY FROM DIVERSE SOURCES

(71) Applicant: Oracle International Corporation, Redwood Shores, CA (US)

(72) Inventors: Paul Timothy Dale, Moggill (AU); P. Denis Gauthier, Wights Mountain (AU)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/164,720

(22) Filed: Oct. 18, 2018

(65) Prior Publication Data

US 2019/0050202 A1 Feb. 14, 2019

Related U.S. Application Data

(63) Continuation of application No. 15/450,434, filed on Mar. 6, 2017, now Pat. No. 10,140,095.

(60) Provisional application No. 62/395,961, filed on Sep. 16, 2016, provisional application No. 62/377,488, filed on Aug. 19, 2016.

(51) Int. Cl.
*G06F 7/58* (2006.01)

(52) U.S. Cl.
CPC .............. *G06F 7/582* (2013.01); *G06F 7/58* (2013.01); *G06F 7/588* (2013.01)

(58) Field of Classification Search
CPC . G06F 7/58; G06F 7/582; G06F 7/584; G06F 7/586

USPC ...................................................... 708/254
See application file for complete search history.

(56) References Cited

U.S. PATENT DOCUMENTS

| | | | |
|---|---|---|---|
| 5,778,069 A | 7/1998 | Thomlinson et al. |
| 6,480,072 B1 | 11/2002 | Walsh et al. |
| 7,251,734 B2 | 7/2007 | Blangy et al. |
| 7,860,912 B1 | 12/2010 | Gyugyi et al. |
| 8,761,390 B2 | 6/2014 | Peirce et al. |
| 9,658,832 B2 | 5/2017 | Tsirkin |
| 2007/0100921 A1 | 5/2007 | Barnett et al. |
| 2007/0130240 A1 | 6/2007 | Janke et al. |
| 2008/0136697 A1 | 6/2008 | Cho et al. |

(Continued)

FOREIGN PATENT DOCUMENTS

WO 2018034699 A1 2/2018

OTHER PUBLICATIONS

Gauthier et al., "Entropy Finding Random Bits for Open SSL", Oracle Network Security & Encryption, May 19, 2016, 23 pages.

(Continued)

*Primary Examiner* — Andrew Caldwell
*Assistant Examiner* — Emily E Larocque
(74) *Attorney, Agent, or Firm* — Kilpatrick Townsend & Stockton LLP

(57) ABSTRACT

Methods and systems are disclosed for generating more random data or ensuring more random data than provided by single sources. Entropy is gathered among multiple random or pseudo-random sources at different frequencies. The entropy is pushed, pulled, or otherwise presented to a pseudo-random number generator when there is enough entropy. The determination of enough entropy can be through a modified Hamming distance. The frequencies of polling for entropy from the entropy sources can be jittered by a random amount.

20 Claims, 7 Drawing Sheets

(56) References Cited

U.S. PATENT DOCUMENTS

2011/0022916 A1    1/2011   Desai et al.
2018/0052662 A1    2/2018   Dale et al.

OTHER PUBLICATIONS

U.S. Appl. No. 15/450,434, Final Office Action dated Mar. 28, 2018, 34 pages.
U.S. Appl. No. 15/450,434, Non-Final Office Action dated Nov. 3, 2017, 28 pages.
International Application No. PCT/US2017/020893, International Search Report and Written Opinion dated Jun. 8, 2017, 15 pages.
Corrigan-Gibbs et al., "Recommendations for Randomness in the Operating System, or How to Keep Evil Children out of Your Pool and Other Random Facts", Holos' 15 Proceeding of the 15' Unesix Conference in Hot Topics, May 18-20, 2015, pp. 1-8.
Eastlake et al., "Randomness Requirements for Security (RFC 4086)", Network Working Group RFC 1717, Internet Society (ISOC), Jun. 2005, pp. 1-48.
Gutmann, "Cryptographic Security Architecture: Design and Verification—Chapter 6: Random Number Generation", Cryptographic Security Architecture: Design and Verification—Chapter 6: Random Number Generation, Jan. 1, 2004, pp. 215-273.
Silicon Labs, "Fortuna Cryptographically Secure PRNG", Available online at: URL:https://www.silabs.com/documents/public/application-notes/AN0806.pdf, Dec. 19, 2013, 16 pages.
Toponce, "The Linux Random Number Generator", https://pthree.org/2014/07/21/the-linux-random-number-generator/, Jul. 21, 2014, 8 pages.
Viega, "Practical random number generation in software", Computer Security Applications Conference, Proceedings, 19th Annual, Dec. 8, 2003, 12 pages.

COLLECTING ENTROPY FROM DIVERSE SOURCES

CROSS-REFERENCES TO RELATED APPLICATIONS

This application is a continuation of U.S. application Ser. No. 15/450,434, filed Mar. 6, 2017, which claims the benefit of U.S. Provisional Application No. 62/395,961, filed Sep. 16, 2016, and U.S. Provisional Application No. 62/377,488, filed Aug. 19, 2016, the contents of which are hereby incorporated by reference in their entireties for all purposes.

BACKGROUND

1. Field of the Invention

The present application generally relates to electrical digital data processing, specifically techniques to gather entropy for seeding random or pseudo-random number generators or other purposes.

2. Description of the Related Art

The OpenSSL entropy model is considered weak in some quarters. In its current state, it would result in a no-entropy caveat on any new Federal Information Processing Standards (FIPS) certificate. Moreover the National Institute of Standards and Technology (NIST) is taking more interest in the entropy source as part of FIPS validation, and it is likely that a reasonable entropy model will be mandated at some point in the future. It is worth noting that OpenSSL's entropy on some platforms, notably the Solaris® operating system, is much better than on others. The Oracle Fusion Middleware and Database organizations in particular typically require a high level of security on a variety of platforms. Improved entropy in OpenSSL could also benefit other organizations as well.

In FIPS mode, OpenSSL has no internal entropy. It relies completely on the hosting application to provide all of its entropy. While there is a check to see that something has been provided, OpenSSL does not concern itself with the quality of the entropy and does not reseed the internal pseudorandom number generator (PRNG)—these being left as problems for the user. Because users vary, so will the quality of the supplied entropy. There is a good chance that the user will not have sufficient time or expertise to properly assess entropy sources.

Outside of FIPS mode, OpenSSL reads 32 bytes—256 bits—of entropy from /dev/urandom and uses that as a seed for the internal PRNG. Nominally, it never reseeds the PRNG, although the user can call an application programming interface (API) to do so. NIST rates /dev/urandom as providing zero entropy, although in practice it should be somewhat better than nothing.

OpenSSL has a single global pseudo random number generator for its entire lifetime—regardless of the number of connections or the number of threads. This means that OpenSSL provides little-to-no forward security in the case of a compromise of the PRNG. In contrast other TLS (transport security layer) packages maintain a number of random number generators, each seeded from the global random number generator, which provide such protection.

OpenSSL version 1.1 attempts to generate some entropy internally, although it is on an ad hoc basis, and no attempt appears to be made to quantify either the quality or the quantity generated. The remainder of the entropy model is unchanged from OpenSSL version 1.0.

Because OpenSSL's default entropy model does not reseed and does not segregate its pseudo random number generator streams, an attacker who compromises the PRNG can break all subsequent connections. In theory a well-resourced attacker could store encrypted communications, spend a year to break the first part of a secret communication, and then be able to read everything from that point forward. Such a lag in intelligence could be well within its expected secrecy lifetime. In other words, reseeding may be required for forward secrecy.

There is a need in the art for better, more entropic seeding of PRNGs for encryption and other applications.

BRIEF SUMMARY

Generally described are methods, devices, and systems for generating entropy for pseudo-random number generators and other consumers of entropy in a computing device. Multiple software timers are set to repeatedly trigger timer events. Each timer corresponds to a different entropy source, whether a hardware or software source. During a timer event, a predetermined number of bits are collected or gathered from the entropy source. The predetermined number is based on an amount of entropy expected per bit from the entropy source and may be theoretically derived or empirically measured. The bits are presented as a seed to a pseudo-random number generator. The other entropy source or sources are polled the same way.

The frequencies of the timers can be jittered based on an output from the pseudo-random number generator. The entropy bits can be accumulated into a buffer before sending in larger chunks to the pseudo-random number generator.

Some embodiments of the present application are related to a method for generating entropy in a computing device. The method includes setting a repeating first timer for a first frequency, setting a repeating second timer for a second frequency, collecting a predetermined number of first bits from a first entropy source at the first frequency, the predetermined number based on an amount of entropy per bit attributable to the first entropy source, presenting the first bits to a pseudo-random number generator, gathering a specified number of second bits from a second entropy source at the second frequency, the specified number based on an amount of entropy per bit attributable to the second entropy source, and presenting the second bits to the pseudo-random number generator. The first and second bits can be used to seed the pseudo-random number generator. The first and second frequencies can be different from each other. Further, they can be different and not whole number multiples (i.e., harmonics) of one another.

The first frequency can be periodically adjusted. It can be adjusted based on an output from the pseudo-random number generator. The adjusting can be adding or subtracting up to 5% of the first frequency. The periodicity of first frequency adjustment can be randomized. The periodicity of first frequency adjustment can be within a range of 5 seconds to 60 seconds. The second frequency can be periodically adjusted based on an output from the pseudo-random number generator.

The method can further include accepting the first bits into an accumulation buffer upon the collecting, and presenting the first bits from the accumulation buffer to the pseudo-random number generator upon the accumulation buffer becoming full, thereby providing a greater amount of sudden entropy than in a single collection of first bits. The method can further include calculating a Hamming distance between successive collected first bits, and accepting the collected first bits into the accumulation buffer based on the calculated Hamming distance exceeding a minimum. The method can include summing Hamming distances between successive collections of first bits into an accumulated value of entropy attributed to contents of the accumulation buffer, and providing the accumulated value of entropy to the pseudo-random number generator. The method can include emptying the accumulation buffer before a subsequent collection. The accumulation buffer can be a first accumulation buffer, and the method can further include accepting the second bits into a second accumulation buffer upon the gathering, the second accumulation buffer having a different size than a size of the first accumulation buffer, and presenting the second bits from the second accumulation buffer to the pseudo-random number generator upon the second accumulation buffer becoming full.

The first or second frequency can be selected from the group consisting of once per 0.1287 seconds, 0.13 seconds, 0.1370 seconds, 0.15 seconds, 0.25 seconds, 0.715 seconds, 0.751 seconds, 0.753 seconds, 1.13 seconds, 1.27 seconds, 1.6626 seconds, 2 seconds, 2.222 seconds, 2.2427 seconds, 4.4 seconds, 4.9 seconds, 5.9 seconds, 9.81 seconds, 10.000 seconds, 11.913 seconds, and 15 seconds.

The first or second entropy source can be selected from the group consisting of: instantaneous or accumulated central processing unit (CPU) usage; physical or virtual memory usage; network traffic volume; least significant time values of a high resolution clock; an input/output (IO) statistic; an Intel x86 RDRAND instruction; an Intel x86 RDSEED instruction; an Intel Itanium ar.itc register; a UNIX or Linux /dev/random file; a UNIX or Linux /dev/urandom file; an OpenBSD, Solaris, or Linux getentropy system call; a Solaris or Linux getrandom system call; a Microsoft Windows CryptGenRandom function; a Linux /proc/diskstats file; a Linux /proc/interrupts file; a Linux /proc/meminfo file; a Linux /proc/net/dev file; a Linux /proc/timer_list file; a Linux/S390 /dev/prandom file; a BSD Unix /dev/srandom file; a Microsoft Windows win_processes module; and a user interface information source.

The method can include generating a random number through the pseudo-random number generator based on the first bits or second bits. The setting of the first timer or the second timer can include making a system call. The collecting of the predetermined number of first bits and the gathering of the specified number of second bits can occur upon firing events of the respective timers. The pseudo-random number generator can be configured to generate numbers, characters, and other symbols.

Some embodiments can be related to a method for seeding entropy in a pseudo-random number generator. The method can include setting asynchronous timers of different frequencies, collecting a predetermined number of first bits from a first entropy source according to a first timer of the asynchronous timers, calculating a Hamming distance between successive collected first bits, accepting the first bits into a first accumulation buffer based on the Hamming distance exceeding a minimum, summing Hamming distances between successive collections of first bits into an accumulated value of entropy attributed to contents of the first accumulation buffer, presenting contents of the first accumulation buffer to a pseudo-random number generator, gathering a specified number of second bits from a second entropy source according to a second timer of the asynchronous timers, and accepting the second bits into a second accumulation buffer, the second accumulation buffer having a different size than a size of the first accumulation buffer, and presenting contents of the second accumulation buffer to the pseudo-random number generator. The asynchronous timers can have different frequencies that are not harmonics of one another.

The method can include jittering frequencies of the asynchronous timers.

Yet other embodiments related to systems executing the above-referenced methods and machine-readable tangible storage media that employ or store instructions for the methods described above.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

DETAILED DESCRIPTION

Embodiments are related to an entropy module that is designed as a framework to integrate many entropy sources for a diverse set of platforms. The implementation takes careful consideration of how to incorporate multiple sources with various entropy generation rates in a secure manner. The design balances the need for high volumes of quality entropy against requirements for good performance and small memory footprint.

It is designed as a framework to integrate many entropy sources for a diverse set of platforms. The implementation takes careful consideration of how to incorporate multiple sources with various entropy generation rates in a secure manner. Important to the design is consideration for issues of trust around entropy.

FIGURES

Figure 1:
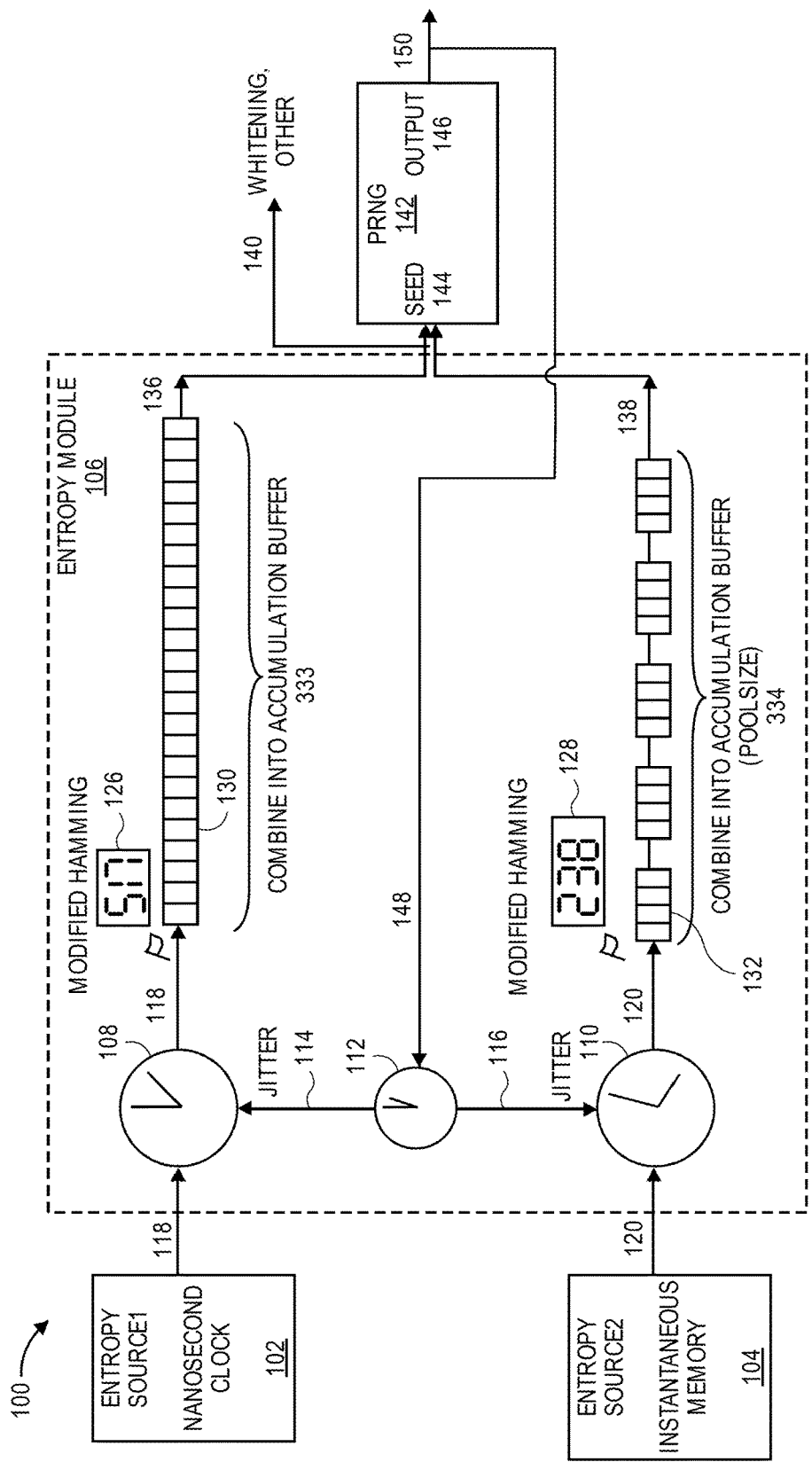
FIG. 1 illustrates an entropy module in accordance with an embodiment.

FIG. 1 illustrates an entropy module in system 100. In entropy module 106, timers 108 and 110 are set up to periodically poll, or otherwise collect or gather, entropy (i.e., random bits or as otherwise known in the art) from first entropy source 102 or second entropy source 104, respectively. The frequencies of polling for the entropy sources are different from one another. One frequency may be at 0.751 seconds between gatherings, which the other frequency may be at 3.3 seconds between gatherings.

More entropy sources than two can certainly be provided. For example, three, four, five, or ten, twenty, or hundreds of entropy sources may be polled. An event timer can be associated with each entropy source such that code executes to collect data from the entropy source when the timer event occurs.

The frequencies of at least two of the timers are not harmonics of one another. That is, the frequency of one timer is not a whole number multiple of the other timer. For example, the timers can be at frequencies of 1/1.27 seconds and 1/0.715 seconds. However they are not at 1/1.127 seconds and 1/2.254 seconds, which are different by a factor of exactly two.

If a modified Hamming distance 126 (see infra) of entropy 118 from first entropy source 102 compared with previous entropy from first entropy source 102 is less than a threshold number, then the present entropy is rejected. If it is greater-than-or-equal-to the threshold, then the present entropy is accepted from first entropy source 102 as bits 130, which can be accepted into first accumulation buffer 333. That entropy is immediately forwarded as bits 136 to pseudo-random number generator (PRNG) 142 upon collection.

If a modified Hamming distance 128 of entropy 120 from second entropy source 104 compared with previous entropy from second entropy source 104 is less than a threshold number, which may be different from that for the first entropy source, then it is rejected. Otherwise, it is accepted as bits 132 into second accumulation buffer 334. Only after accumulation buffer 334 is full, then accumulation buffer 334 is flushed as bits 138 to PRNG 142. The accumulation buffer can be "full" when, for example, the entire memory allocated for the buffer is filled with bits, a count goes over a certain number, a pointer to the next unused bit exceeds the designated buffer size, or as otherwise known in the art.

In some embodiments, bits from entropy module may be forwarded 140 to a whitening algorithm instead of seed memory location 144 for PRNG 142.

PRNG 142 output 146 sends randomized bits 150 to various uses, including encryption key generation, application programs, etc. PRNG output 146 is also polled at an interval determined by timer 112 as random bits 148. Random bits 148 are used to increase or decrease, or otherwise jitter, timers 108 and 110. The jitter can be plus or minus a few percentage points, such as ±1%, 2%, 3%, 4%, 5%, 7%, 10%, 15%, 20%, 25%, 30%, 33%, or otherwise as understood in the art by "jitter" as timer. This is so that the frequencies of entropy source polling timers 108 and 110 change.

The random bits are added to or subtracted from the time to the next poll of a timer. For example, The output of the PRNG may be the number 789 (out of a range of 0 to 32,767). If the time is to be jittered by a maximum of ±12%, then the next period may be adjusted by ((789/32767)*2−1)*0.12*nominal_interval_period.

Figure 2:
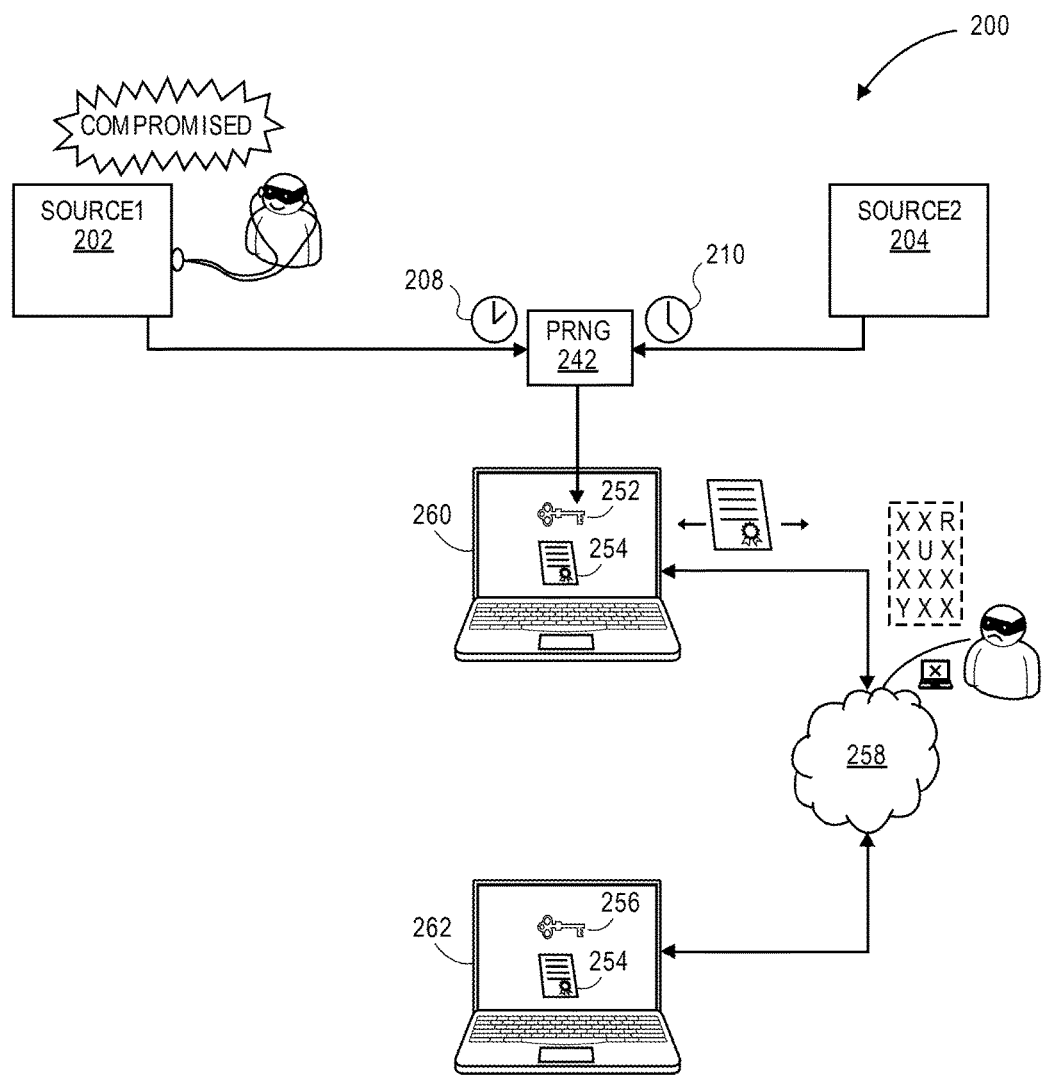
FIG. 2 illustrates foiling an eavesdropper in accordance with an embodiment.

FIG. 2 illustrates foiling an eavesdropper in a typical use case. Entropy source 202 is compromised by a determined entity. For example, the manufacturer of a hardware-based entropy generator 202 may have conceded data to a government that shows that the entropy generator is slightly skewed. The government may be able to actively force the entropy generator to skew by judicial or other means.

Entropy source 204 is not compromised. It may be manufactured by an entity outside the jurisdiction of the government involved in compromising entropy generator 202. The entropy sources are polled at disparate frequencies or periods set by timers 208 and 210 to PRNG 242. PRNG 242 is used by computer 260 to create encryption key 252. Encryption key 252 is used to encrypt document 254. Encrypted document 254 is sent via network 258 to computer 262.

Computer 262 decrypts document 254 using decryption key 256. Decryption key 256 may or may not be the same as encryption key 252.

Although the eavesdropper can intercept document 254 on network 258, eavesdropper cannot decode the document. Encryption key 252 was made from random bits from PRNG 242. But at the time the key was made, PRNG 242 was partially seeded from uncompromised entropy source 204.

Even if an encryption key were made from random bits that were generated from a compromised entropy source, such as source 202, and the eavesdropper were able to decode a document, the next encryption key may not be generated from the compromised source. Thus, an eavesdropper who only has cracked one entropy source may not have free and full clarity on every single message sent from computer 260. With two entropy sources as shown in the figure, the eavesdropper may only expect to decode messages from the computer up until a seed from noncompromised source 204 is used. That seed adds new entropy to the process from that point on. The eavesdropper must expend the time and resources to compromise the other source.

Gathering entropy from more than two entropy sources can further complicate the eavesdropper's efforts. Increasing the number of entropy sources will increase the number of sources that an eavesdropper must compromise, thereby decreasing the probability that an intercepted message can be read.

Jittering the collection/gathering timer for the various entropy sources will further complicate the eavesdropper's task. The eavesdropper will have a difficult time knowing when each entropy source will be seeded. If the encryption keys are changed every 10 seconds plus or minus some jittered time, then any message or part of a message encrypted within the jitter time is not guaranteed to be unencrypted properly by the eavesdropper. While it may be readily apparent in text communications when a message is not properly unencrypted, it may be more difficult to determine in tables of numbers or details in bitmaps.

Figure 3:
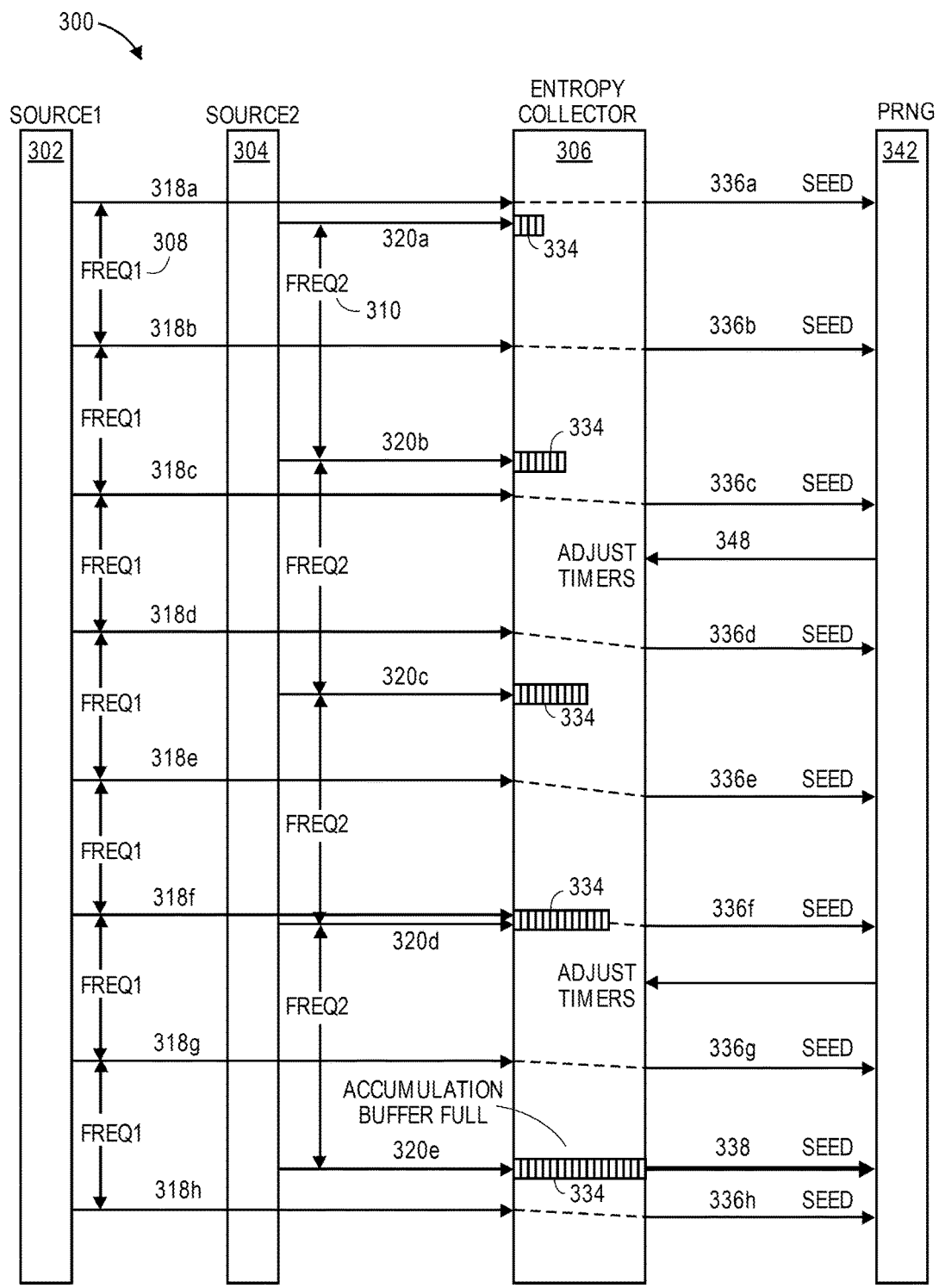
FIG. 3 is a sequence diagram in accordance with an embodiment.

FIG. 3 is a sequence diagram for system 300 with time running from top to bottom. At a first time, source 302 supplies entropy 318*a* to entropy collector 306. That entropy is forwarded as seed 336*a* immediately to PRNG 342. At periodic time intervals following, at frequency 308, entropies 318*b*, 318*c*, 318*d*, 318*e*, 318*f*, 318*g*, 318*h*, and beyond from entropy source 302 are forwarded as 336*b*, 336*c*, 336*d*, 336*e*, 336*f*, 336*g*, 336*h*, and beyond to PRNG 342.

Interleaved with entropy collections from entropy source 302 are gatherings (i.e., other collections) from entropy source 304. At a first time, entropy source 304 supplies entropy 320*a* to entropy collector 306. That entropy is buffered in accumulation buffer 334. At periodic time intervals following, at frequency 310, entropies 320*a*, 320*b*, 320*c*, 320*d* and 320*e* from entropy source 306 are stored in accumulation buffer 334. When accumulation buffer 334 is full, in the exemplary case when entropy 320*e* is accepted into accumulation buffer 334, the buffer is sent or pushed as seed 338 to PRNG 342. Accumulation buffer 334 is then purged or otherwise reset.

In the event source 302 were compromised, then an attacker may be able to read all messages encrypted by output from PRNG 342 until the point that entropy from uncompromised source 304 is sent to PRNG 342. That is, when seed 338 is pushed (or pulled) to PRNG 342, encryption based on the output of PRNG 342 may no longer be thwarted.

The periodic time intervals for frequencies 308 and 310 can be jittered so that they are not precisely periodic. Rather, their periodicity is more chaotic, centered around a precise periodicity.

Figure 4:
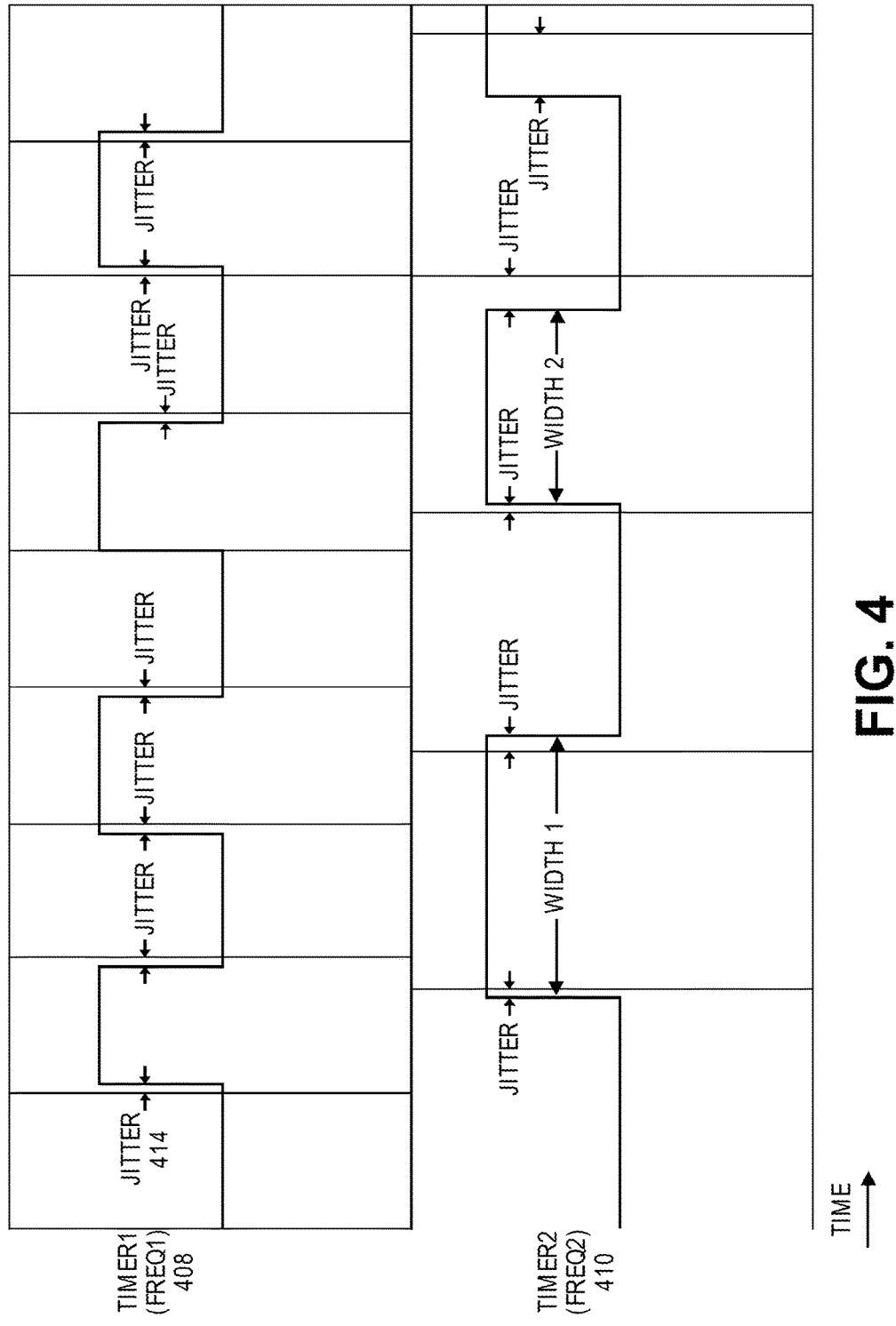
FIG. 4 is a timing diagram with two entropy source sampling frequencies in accordance with an embodiment.

FIG. 4 is a timing diagram with two entropy source sampling frequencies in accordance with an embodiment. A representation of first timer 408 is shown at the top of the figure. Every leading edge or downward edge represents a timer event. Nominally, first timer 408 fires at every vertical line. In the figure, the pulses of first timer 408 are delayed or accelerated by random jitter 414. The amount of the delay or acceleration is determined the output of a pseudo-random number generator.

A representation of second timer 410 is shown at the bottom of the figure. Nominally, second timer 410 fires at every vertical line, which is at a different, nonharmonic frequency as first timer 408. In the figure, the jittering is shown not only as deviations from a nominal period but alternatively as larger or smaller 'pulse' widths.

A "timer" includes an event-driven timer that are settable to repeatedly fire, or cause an event, in many popular computer operating systems. For example, one can create a timer in Java by the code:

```
import java.util.Timer;
:
Timer timer1 = new Timer( );
```

A resulting event can interrupt a normal process, begin a new thread, or otherwise run code as known in the art.

A "frequency" is associated with a timer and is the reciprocal of the timer's nominal period between events. That is, freq=1/T. A timer can be set to repeat every T seconds.

Sources

The entropy module gathers from a number of sources. For the tables that follow, testing was conducted on a minimum of three sources, at least one of which was fast, for each platform. This target was achieved on all platforms and well exceeded for several.

| Source | OS | Processor Notes |
|---|---|---|
| CPU instruction counter | x86, Itanium, Sparc | TSC, ITC & TICK registers |
| CPU statistics | AIX, HP-UX, Linux, Solaris | |
| High speed timers | all | |
| HRNG | x86 | RDRAND/SEED, disabled by default |
| Interrupt statistics | Linux | |
| IO statistics | AIX, HP-UX, Linux, Solaris | |
| Memory statistics | AIX, FreeBSD, Linux | |
| Network statistics | FreeBSD, Linux | |
| OS entropy sources | all | Disabled by default |
| Process information | Windows | |
| Time of day | all | If no high speed timers present |

The implementation of the sources is modular and it is straightforward to add new sources rapidly. For example, it only took a couple of hours of effort to create a source which dynamically loaded and used the open source entropy library libhavege.

Seeding

In addition to sources of entropy, a module was created that gathers seed material from a number of locations at initialisation time and after a fork(2) is detected. The seed material is fed into the entropy pool in order to distinguish different instances of the entropy module. No entropy is counted for any of the seed material.

| Source | Where | Notes |
|---|---|---|
| Directories | Unix, Linux | The dirent entries for volatile directories |
| Environment | Unix, Linux | |
| Files | Unix, Linux | An assortment of interesting files |
| Hostname | all | |
| HRNG | x86 | |
| kstat(2) | Solaris | |
| Network interfaces | Linux, Solaris | |
| OS entropy sources | all | Non-blocking sources by default |
| Registry | Windows | Only a few specific values |
| sysconf(3) | Unix, Linux | |
| sysinfo(2) | Unix, Linux | |
| Times | all | Time of day or high speed timer |
| User IDs | all | uid, pid, et al |

Flexible

Using a simple configuration system, the entropy module's behaviour can be altered during initialisation. Entropy sources and seed sources can be enabled or disabled individually. Entropy sources can have their tuning parameters altered to change the rate of entropy production, reduce system load, alter internal buffer sizes or update the estimated entropy quality.

Example Application

A potentially minimal threaded example of the changes required to integrate the entropy module into an application is:

```
#include <nse_entropy.h>
#include <time.h>
#include <math.h>
#include <pthread.h>
static void *nse_entropy(void *a) {
NSE_entropySource sources = (NSE_entropySource)a;
for (;;) {
const double d = NSE_entropy_update(sources);
if (d > 0)
usleep(1e6 * d);
}
return NULL;
}
int main(int argc, char *argv[ ]) {
pthread_t nse_thread;
NSE_entropySource sources = NSE_entropy_new(NULL,
&RAND_add, &RAND_bytes);
...
pthread_create(&nse_thread, NULL, &nse_entropy, sources);
...
pthread_cancel(nse_thread);
NSE_entropy_free(sources);
return 0;
}
```

If the module were integrated into OpenSSL, the outward facing API could be further simplified.

Integration into OpenSSL

The entropy module, or a derivative, could be offered for inclusion as part of the OpenSSL distribution in order to help improve the security of the Internet.

The entropy module would require some changes to integrate it into OpenSSL:

The current API uses the NSE and nse prefixes as a namespace for global symbols. These may have to be changed to conform with the OpenSSL naming conventions.

The module may have to be modified to use OpenSSL's internal utility functions instead of its own. The major ones are the memory allocation and configuration management, both of which were designed to be similar to the OpenSSL interfaces.

Some of the hardware abstractions may need to be updated to use OpenSSL's equivalents.

The module may need to be integrated into the OpenSSL build infrastructure.

Hooks may need to be put in place so that the module is serviced periodically by OpenSSL.

FIPS Status

This module was designed with the FIPS standards in mind. Extensive data collection has been undertaken for the supported platforms and subjected the outputs to the first draft SP 800-90B entropy tests. The results of these tests were then fed back into the entropy source tuning parameters.

Design Considerations

Three major considerations should be taken into account by the design of a software entropy module:
1. the existing limitations in the OpenSSL entropy module;
2. security principles and
3. machine resources.

OpenSSL Limitations

Security

Two guiding security principles may be observed in designing a software module to provide high quality entropy: provide diversity and aggregate appropriately. Both of these may be required to provide a trustworthy and secure entropy feed.

Provide Diversity

The first principle is that more sources is better. Relying on just one source means that only one source needs to be compromised in order to break the entropy system. With two sources of good entropy, breaking one of them doesn't degrade the entropy system's operation.

Aggregate Appropriately

The second principle is that the entropy should be buffered into reasonable sized lumps before being sent on to OpenSSL's PRNG. The rationale here is that dribbling a few bits of entropy at a time would permit an attacker to prolong a compromise of OpenSSL's pseudo random number generator via brute force guessing. By buffering the entropy and releasing a relatively large amount at a time, this isn't feasible.

Resource Impact

The final guideline is to not use excessive amounts of central processing unit (CPU) or memory. At no time should the entropy subsystem, hog the CPU. It must play nicely with the other parts of the system that are doing the users' desired work. In order to mitigate against resource deprivation attacks, resource allocations should take place at initialisation time. This reduces the possibility of untimely allocation failures and eliminates some of the error processing during normal operation. A corollary to this is that care should also be taken to clear allocated buffers immediately after their use in order to prevent any possibility of information leakage. In particular, an entropy buffer must always be cleared after its contents are forwarded anywhere.

Overview of the Entropy Module

One goal is to create a software module that generates high quality entropy and periodically reseeds OpenSSL. The module must be able to do so consistently across the set of platforms used by the Fusion Middleware organisation. The entropy source runs in two phases.
1. Initialisation: in this phase, system information is gleaned and forwarded to the caller and is used to distinguish similar but distinct operating environments. For example, two processes on a machine could have identical entropy if their process identifications were not added to the pool. However, none of this initialisation data is considered as possessing any entropy.
2. Collection: in this phase entropy is collected and forwarded to the caller.

Each of the entropy sources produces bits of entropy periodically. The quality and speed of generation will clearly vary between sources and this must be accounted for in the design. The quality of the generated entropy is estimated and accumulated in a per source buffer. Once there is sufficient estimated entropy in an accumulation buffer, it is forwarded to the output cache which whitens and compresses the entropy. The entropy in the output cache can be requested by the calling application and, once the cache is full, an overflow mechanism for exporting the excess entropy to the output cache or calling application is also present. An important point here for some embodiments is that each entropy source is acting independently of all of the others and at no point does the entropy from any two sources get mixed, at least until it is ready for the application to use. This helps mitigate against potential attacks based on the timing and quality differentials, as detailed later.

Entropy Module Design Considerations

Diversify multiple independent sources

Use a scheduler

Handles reseeding for forward secrecy

Every source has a different entropy generation rate and that determines the appropriate polling interval and when to push to the application's pool Performance: don't starve your system Conditioning Each of the entropy sources produces bits of entropy periodically. The quality and speed of generation will clearly vary between sources and this should be accounted for in the design. The quality of the generated entropy is estimated and accumulated in a per source buffer. Once there is sufficient estimated entropy in an accumulation buffer, it is forwarded to either the output cache or to the calling application's pseudo random number generator using the provided call back. In these embodiments, each entropy source can act independently of all of the others, and at no point does the entropy from any two sources get mixed, at least until it is ready for the application to use. This helps mitigate against potential attacks based on the timing and quality differentials, as detailed later.

The entropy module will also include a scheduler that handles the actual execution of each of the entropy sources based on a tuned minimum timing period. By default, this represents a fixed polling interval. The scheduler has to ensure that all gathering tasks are executed not before they are due, that they are run in a fair and unbiased manner and that the entropy module does not consume too many CPU resources.

The final component of the entropy module is an optional feedback loop where amalgamated and whitened entropy from the output cache is used to jitter the timing intervals. This does not increase the quality of the generated entropy, but it does mitigate against attacks on the otherwise completely deterministic generation timing. The downside is that this will introduce some correlation between the different sources. However, the entropy is extracted after a whitening stage so this seems an improbable attack vector. An important facet here in some embodiments is that the entropy module should extract far less entropy from the application for this purpose than it is supplying lest it defeat its own raison d'être.

Entropy Estimation

It is currently mathematically impossible to prove that a collection of data are random. However, it is possible to confidently claim that a collection of data is not random in some cases. One needs a way to provide a conservative estimate of how much entropy is in a block of data from a given source and how fast that source delivers the entropy. To accomplish this, we begin by collecting per-source per-platform data and then we estimate the collected entropy at a given polling interval using several entropy estimation tools.

The polling interval is selected according to what is appropriate for the source with consideration for the limited resources of the platform. Polling for entropy in a tight loop is inefficient and will not give the system sufficient time between polls to accumulate a reasonable amount of entropy. The direct consequence of this is that the entropy estimate limits would have to be tightened resulting in very conservative bounds. In turn, this would necessitate more time and resources be spent gathering entropy, resulting in a monopolisation of system resources. Instead we collect entropy at a moderate rate and accept a certain amount of autocorrelation which will be dealt with by the client's PRNG mechanism.

The module will use a modified version of the Hamming distance metric to verify that bits are changing and are doing so at a reasonable rate. The output from this metric will be used as an estimator for the amount of change since the previous sample and will be used to limit the claimed entropy obtainable from a source.

Design Details

There are some finer points that deserve specific mention and elucidation before the architectural details are presented.

Reseeding May be Necessary

Because OpenSSL only seeds its PRNG once at start up, repeated reseeding may be required in the interest of forward security. At this point the NSE team does not have permission to make changes to the OpenSSL source code base, so entropy is added by periodically pushing some into OpenSSL using the seeding APIs.

Each of the sources of entropy will have its own local buffer that accumulates entropy from this source until there is a substantial amount. The accumulated entropy is then released to OpenSSL in a single block. This prevents a brute force attack against the pseudo random number generator as long as at least one source has not been compromised. Details are provided below.

The demon releases entropy gathered by each of the available sources when they fill their local buffer. This is done by invoking the call back provided to the entropy module during initialisation. Generally this will be either the RAND_add or the FIPS_rand_add OpenSSL API call.

Under this model, if any one of the entropy sources resists an attacker then some protection remains because quality entropy is still being obtained and once a buffer full is released to the calling application, an attacker is reduced to knowing nothing about the application's entropy. It takes a compromise of all of the entropy sources and of OpenSSL itself to break this entropy model.

For performance reasons, the sources should never block waiting for entropy to become available. Rather, the sources should check periodically and push any entropy that is immediately available into their internal pool. The period of each source should be based on the rate of incoming entropy which is determined empirically through data collection and statistical analysis.

By making the sources' polling periods different and predominately co-prime, a degree of aperiodicity will be achieved—albeit a fairly predictable one over longer time intervals. Aperiodicity in the sampling isn't necessary, however it could be beneficial in the situation where two or more apparently disconnected sources are in fact correlated.

Initialisation Quiescence

When a system starts up, its entropy state is generally quite poor if it has no hardware randomness source or stored entropy from a previous shut down. The same will be true of the entropy module and there is no immediate solution. The system will rapidly come to a steady state of operation where entropy is available, so it is important to reseed early on.

Embedded devices often generate keys and other cryptographic material from a state of near zero entropy which results in repetitive cryptographic material across different devices. To partially mitigate this vulnerability, a number of system settings and configurations can be used to provide an initial variation that distinguishes different hosts and processes. No entropy is attributed to these system settings and configurations.

Buffering is Good

As noted previously, sending small quanta of entropy to the system pool leaves an opportunity for a brute force attack. For example, adding eight bits of entropy to a sixteen byte pool can be brute forced in $2^8$ time if the location of the new bits are known and in $2^{8} \cdot {}^{128}C_8 \approx 2^{48}$ time if not. Both of these are significantly easier than the $2^{128}$ time required to brute force the entire pool. Because the location of the new bits are not known, it might not seem strictly necessary to provide a pool containing $2^{128}$ bits of entropy to guard against this attack vector. However it is a trap to rely on obfuscation for security, so the entropy module should guard against the possibility that the location of the new bits could become known to an attacker.

In the presence of sources generating entropy at vastly different rates, a similar issue arises: when the high rate source is compromised, the low rate source is overwhelmed by non-entropic data and its small contribution becomes subject to a brute force attack as above. The mitigation for this attack vector is to buffer entropy from each source into its own local accumulation buffer and to release the entropy to the system pool only when the accumulation buffer is full.

Some entropy sources are of sufficient speed and quality that they do not require the accumulation buffer. These sources should be capable of generating a full buffer of high quality entropy rapidly and without blocking. Such sources can forward their collected entropy directly to the calling application, although provision should be made to support a local collection buffer, if the calling application so requests.

Whitening and CRNGTs

Whitening of entropy sources can be essential as part of a random bit-stream generator, however it is not necessarily the job of an entropy module to provide this. Instead of including a whitening service and continuous testing, one can rely on the calling application to perform these operations after entropy has been forwarded to it. In the case of OpenSSL, these facilities are mandatory as part of its pseudo random number generator module. Having the entropy module also undertake them as well would double the effort involved for no benefit. If a back end apart from OpenSSL is ever required, an optional whitening and CRNGT (continuous random number generator test) module could be added.

Each entropy source should avoid measures that attempt to whiten its output because doing so can only reduce the quality of the entropy produced—it isn't generally possible to create more entropy via whitening alone. Shuffling and rearranging bits can assist in gaining better results on the statistical entropy estimation tests, but they normally cannot increase the underlying entropy and thus should be avoided. The exception which will be permitted is to use a series of exclusive or operations to reduce large data structures into smaller ones.

Timing Jitter

Even though each of the entropy sources defines a polling period (the interval between samples), a global configuration can be set to stochastically increase all polling periods by up to a maximum percentage. The option will never reduce the polling period, and thus should reduce neither the entropy obtained nor the estimated generation rates and quality. It will, however, make the determination of exactly when an entropy source was sampled and what it contained more difficult for an attacker.

Architecture in More Detail

The entropy module consists of an overall management module and a number of entropy source modules.

Management Module

The controlling portion of the entropy module manages the various sources, provides a time order queuing mechanism, handles entropy forwarding to the output cache or calling application and supplies default settings for the various entropy sources.

Initialisation

The entropy module must have a capability to be created and destroyed cleanly. The API section details the specifics of the interface for the calling application. Internally, the initialisation code has to handle the configuration based customisations, present these configuration values for each source and iterate over the various entropy sources and schedule all those which are executable. Finally, the initialisation code should attempt to gather entropy from each available source and to feed this to the output cache or calling application so that some amount of entropy, however small, will be available.

Internally, there can be one initialisation interface—nse_seed_entropy_source—which attempts to gather system dependent seed information that is deemed free of entropy but provides for a differentiator between systems and processes. This interface shall be called during the main library initialisation.

Entropy Source Information

The main module will maintain a local list of all the entropy sources for all platforms. It needs this list to initialise and destroy modules. The actual execution of modules, will be done by the time order queuing module.

The main module must also build and maintain lists of a more informational nature which can be accessed to query which modules might be available before initialisation and which modules are actually usable and other information about them. Both of these lists are exposed via API calls.

Time Order Queuing

Because the sources are gathering entropy on a semi-periodic basis, it is necessary to provide an ability to execute each source when required. This means a time ordered queue. This will be implemented using a priority queue using a heap for efficiency. The only potentially required interfaces are to:

create a new task-less scheduler—nse_new_scheduler;
destroy a scheduler and all its tasks—nse_free_scheduler;
schedule a new repeating task—nse_schedule—and
executing the first task if it is due—nse_run_schedule.

Since the entropy gathering operations are repetitive in nature, the task running call will reschedule the task after executing it. Even though it won't be required initially, some care will be needed here in case the queue is modified during execution. No attempts will be made to mitigate skewing due to the physical run time of any module's entropy gathering code.

Also note that there is no explicit remove a task interface. Setting a task's scheduling interval to zero will effectively remove it after the next time it is executed. Setting the interval to zero in the gather call back, will remove it immediately.

An additional routine is to be provided by the main management module—nse_time_skew_factor—which modifies a source's scheduling interval based on the current time skew factor. This call is to be used by the time queuing to jitter the scheduling slightly. The actual determination of the jitter factor will be done by reading some entropy from the output cache. This entropy is used to generate a uniform random variate which becomes the skewing factor for the next period of time. It would be better to generate a new time skewing factor for every awakening of each entropy source, however this will consume a lot of entropy from the calling application which defeats the purpose of the entropy module.

The calling application is responsible for servicing the entropy module regularly and this servicing is a fairly lean wrapper over the time ordered scheduling queue dispatch mechanism.

Entropy Pool Management

The management module is responsible for forwarding blocks of entropy to the output cache or calling application via the call back given at creation. It also manages the per source amalgamation of entropy bytes. The interface for both of these cases is identical from the perspective of the entropy sources, the management module deciding, based on configuration settings predominately, when to send the entropic blocks to the output cache or calling application.

The available calls are:

add a block of raw bytes to the destination—nse_add_entropy_pool—and
add data to the destination if enough has changed—nse_copy_entropy_pool_if sufficient.

The former call erases the memory passed to it before returning. The later copies the new buffer to the old before clearing the new.

File Based Entropy Sources

For convenience to aid with entropy sources that rely on an underlying system pseudo-file, a number of utility and support routines will be made available:

create a new file based entropy source—nse_file_source;
destroy a file based entropy source—nse_file_source—and
acquire entropy from a file based source—nse_get_file_source.

Wrappers for getrandom(2) and getentropy(2)

The entropy module provides internal wrappers for the getrandom(2) and getentropy(2) system calls. These are nse_getrandom and nse_getentropy calls respectively. They both return the number of bytes of entropy added to the passed buffer. For systems that do not support these system calls, these functions always return zero.

Helper Functions for Specific Hardware Platforms

There are a number of functions available which provide access to some specific hardware features in a machine, platform and compiler independent manner. These are:

check for an instruction counter—nse_have_instruction_counter;
query the instruction counter, if available—nse_read_instruction_counter;
check for pseudo random number generator hardware—nse_have_rdrand;
check for true random number generator hardware—nse_have_rdseed;
query the pseudo random number generator, if available—nse_rdrand and
query the hardware true random number generator, if available—nse_rdseed.

Even though these latter four are ostensibly x86 specific instructions, there is a possibility that some of these will be supported for other architectures.

Entropy Source Modules

Each of the entropy sources provides three interface calls:
1. initialisation,
2. finalisation and
3. gathering.

The initialisation is potentially required to determine if the source is appropriate for the executing host and, if so, to allocate any memory the source will require for gathering and perform any other initialization tasks including setting any parameters to non-default values.

The finalisation may be required to clean up any allocated memory and other resources created by the initialisation stage.

The gathering call actually does the work of gleaning entropy from the operating system and pushing this off to the management module for accumulation or forwarding.

Cyclic Entropy Buffers

All entropy is accumulated in cyclic buffers. Data is added to these buffers byte-wise using an exclusive or operation. These buffers should also maintain an estimate of the number of bits of entropy they contain. Because estimating the amount of entropy in raw data is difficult, each entropy source will provide its own appraisal as to the quantity of entropy being added. An individual source can take advantage of its additional knowledge to reduce the complexity of the statistics involved.

Buffers can be created, destroyed and cleared. They can also have raw or entropic data added. The difference between the two data addition calls is that entropic data also accumulates a measure of the entropy the bytes contain, whereas raw data will not.

There are also some utility interfaces available for:
flushing an entropy buffer's entropy to the parent application, via the call back provided at initialisation time;
determining the number of bytes in the buffer;
obtaining a pointer to the raw bytes in the buffer;
copying the contents of one entropy buffer to another and
calculating a modified Hamming distance between two entropy buffers.

Memory Allocations

All allocations of dynamic memory should occur during the creation of an entropy module. This helps to mitigate against the effects of resource starvation attacks. Since there are no memory allocations during the normal operation of the module, there are none that can fail.

In order to partially mitigate against attacks seeking to determine the state of the various collection pools for entropic data, all memory allocations that contain entropy, either directly or indirectly, should be locked into memory. This will normally prevent attacks that seek to read such data from a swap file or partition after forcing it to be paged out. This will not normally, however, provide protection from such attempts against a virtual machine and it will not provide protection against other memory snooping attacks.

Entropy Estimation

Estimation of the entropy for each of the source modules will primarily be undertaken using the NIST SP800-90B Python scripts. Although there are more discerning tests available, they require significantly more entropy data to be collected and many of the sources used are too slow to achieve this in a reasonable amount of time. Ideally, each entropy source should pass the NIST IID tests with a level of entropy approaching eight bits per byte. Unfortunately, this will not be possible for all sources without whitening and so lower levels of entropy as estimated by the non-IID test will be used where necessary. It is these lower quality entropy sources that mandated the per source entropy pooling.

Modified Hamming Weight

Rather than using a traditional Hamming weight as an estimator of the entropy in a sample, a modified metric will be used which treats a large number of bit inversions as low entropy. This is to be done by adding the current and previous samples over GF(2), determining a Hamming weight for both the result and its complement and using the lower value.

The examples included below indicate the overestimation that the Hamming metric provides and shows the modified metric's output in the same cases. While still over estimating the actual change, the modified Hamming metric does so to a reduced degree and is thus a more conservative approach.

| Number | Binary | Hamming | Modified Hamming |
|---|---|---|---|
| 42 | 1 0 1 0 1 0 | | |
| 42 + 1 = 43 | 1 0 1 0 1 1 | | |
| Difference | 0 0 0 0 0 1 | 1 | 1 |
| Complement | 1 1 1 1 1 0 | 5 | |

Here the addition of unity results in a single bit change. This case accounts for half of all additions.

| Number | Binary | Hamming | Modified Hamming |
|---|---|---|---|
| 45 | 1 0 1 1 0 1 | | |
| 45 + 1 = 46 | 1 0 1 1 1 0 | | |
| Difference | 0 0 0 0 1 1 | 2 | 2 |
| Complement | 1 1 1 1 0 0 | 4 | |

Here the addition of unity results in a two bit change. This case accounts for one quarter of all additions by one.

| Number | Binary | Hamming | Modified Hamming |
|---|---|---|---|
| 47 | 1 0 1 1 1 1 | | |
| 47 + 1 = 48 | 1 1 0 0 0 0 | | |
| Difference | 0 1 1 1 1 1 | 5 | 1 |
| Complement | 1 0 0 0 0 0 | 1 | |

Here the addition of unity results in a five bit change. The hamming distance is overestimating the change. The modified Hamming metric, on the other hand, is producing a more realistic result. It is for cases like this that its inclusion is justified.

Determining Entropy in a Sample

For slower running and lower quality sources, the distance between the previous sample and the current sample will be used to provide both limits on the claimed entropy and an estimate of the entropy itself.

A lower limit will be specified per source and if the metric doesn't indicate that at least this many bits have changed, the source is deemed to not have changed this interval and the sample is ignored. The entropy estimate used will be double the computed distance metric on the assumption that for each bit that has changed, one would also be expected to have not. An upper limit restricts the maximum amount of entropy that can be claimed per sample.

The lower and upper limits are to be set per entropy source based on empirical data. One should be able to loosen the bounds and possibly remove these limits entirely if one can obtain sufficient data from the various operating systems and architectures to allow the gathering interval and entropy quality for each source to be properly tuned. In these cases, one may have a reliable estimate as to the number of bits that are produced each sample.

API

The API comes from a single header file:
include "nse_entropy.h"

All external interfaces from the entropy module shall have names beginning NSE_. All internal but public interfaces shall have names beginning nse_. Local names are unrestricted and should be hidden.

Version Information from
NSE_ENTROPY_VERSION

This constant holds the entropy module version number. It is a decimal unsigned integer in the format: VVVMM-mmee. VVV is the library revision, MM is the major revision, mm is the minor revision and ee is the extra/emergency revision.

Initialise Using

```
NSE_entropySource NSE_entropy_initialise(NSE_ entropyReaper
sources, void (*overflow)(const void *buf, int num, double
entropy));
```

The initialisation function sets up all the entropy sources and readies everything for ongoing use. It will also provide some initial seeding to distinguish between different instances of the reaper. It reads non-default settings from the passed configuration, which can be deleted immediately on this call's return. If NULL is passed for the configuration, defaults will be used.

The overflow argument provides a call back to push entropy into the calling application's entropy pool once the reaper's output cache is full. In normal operation, this argument can be RAND_add or FIPS_rand_add from OpenSSL. This argument can be NULL, in which case excess entropy is discarded. The amount of entropy is measured in bytes when calling this function, throughout the rest of the library entropy is measured in the more natural bits.

Although it is possible to create multiple instances of the entropy module, doing so is discouraged. There are good reasons to believe that the entropy streams produced by multiple instances would be correlated. Thus, two or more instances might not be capable of producing any more entropy than one.

Obtain Entropy Using

```
int NSE_get_entropy(NSE_entropyReaper, void *, size_t);
int NSE_get_entropy_nonblocking(NSE_entropyReaper, void *,
size_t);
```

These functions get entropy from the internal output cache and place it into the passed buffer. The first call blocks until the entire entropy request can be satisfied. The second call does not block and wait for the entropy to be accumulated and partial returns are possible. Both calls return the number of bytes of entropy copied or −1 on error.

Periodically Call double NSE_entropy_update(NSE_entropySource);

The update function will update the internal entropy pools in a non-blocking manner and pass full pools over to OpenSSL as feasible. It returns the number of seconds until the next entropy event that requires servicing. It is safe to call this more or less frequently than the return value indicates, but utilising this value does allow the caller to sleep between servicing the entropy.

Finish and Destroy with void NSE_entropy_free(NSE_entropySource);

This function destroys an entropy module, frees allocated memory and returns all consumed resources to the operating system. Call this when you are finished with an entropy module and wish to be rid of it. This would typically be on program termination.

Force the Health Checks to be Run Anew with void NSE_entropy_health_checks(NSE_entropyReaper, int immediate);

This function forces the power on health check to be run anew. No entropy will be produced by a source until that source has finished these checks. This will usually take some time, from minutes to hours.

If the immediate argument is non-zero, then the relatively few sources which are capable of rapidly undergoing the health checks will be checked immediately. This will briefly delay execution now but will prevent a complete break in the generation of entropy. The entropy reaping will, however, be running with reduced sources until the remaining entropy sources pass their own health checks. It could be several hours before the reaper is again running at full capability.

Query and Update Functions

There are a number of query and update functions that allow the behaviour of the entropy reaper to be examined and modified. In some embodiments, modifications can only be performed between creation and initialisation. Examination can occur at any time.

The default settings are appropriate for most uses of the entropy reaper and these APIs may not be needed.

Reaper Settings

There are a number of global settings for the entropy reaper. The access APIs will be discussed here.

Buffer Size

```
size_t NSE_entropy_query_buffer_size(NSE_entropyReaper er);
void NSE_entropy_set_buffer_size(NSE_entropyReaper er, size_t
target);
```

These functions allow the ideal internal buffer size to be set for the reaper. By default this size is 33 bytes and each output of entropy will attempt to provide 33×8=264 bits of entropy. Not all entropy sources can provide such flexibility but most do.

Output Cache

```
int NSE_entropy_query_cache(NSE_entropyReaper er, size_t
*size, const char **algoritm, double *rate);
void NSE_entropy_set_cache(NSE_entropyReaper er, int whiten,
size_t size, const char *algoritm, double rate);
```

These functions control the output cache and whitening. The former function returns non-zero if whitening is enabled and optionally the size of the output entropy cache in bytes and the digest algorithm name being used. The latter function specifies whitening or not, the size of the output buffer (which can be zero) and the name of the digest to use to whitening the output. If NULL is passed for the digest, a default will be used.

The rate parameter specifies the level of over-sampling that should be done when digesting entropy. Values below unity are ignored.

The default settings are to whiten using the default algorithm (SHA512), a 1024 byte buffer and an over-sampling rate of 2.

Time Skewing

```
int NSE_entropy_query_time_skewer(NSE_entropyReaper er, double
*int, double *per);
void NSE_entropy_set_time_skewer(NSE_entropyReaper er, int
enbl, double int, double per);
```

The former call queries the state of the time skewer module. It returns non-zero if time skewing is enabled. Additionally, the interval (in seconds) and percentage skew are also returned if the passed pointers are not NULL.

The second call allows the time skewer module to be configured. The enabled setting is also imposed but the interval in seconds and percentage settings are only imposed if the passed values are non-negative.

By default, time skewing is enabled with an interval of 12 seconds and a skew of 5%.

Heath Checks

```
int NSE_entropy_query_health_checks(NSE_entropyReaper er);
void NSE_entropy_set_health_checks(NSE_entropyReaper er, int
enable);
```

The former function returns non-zero if the start up and continuous health tests are to be run. The second call allows the tests to be enabled.

By default the heath checks are disabled.

Verbosity
int NSE_entropy query verbose(NSE_entropyReaper er)
void NSE_entropy set verbose(NSE_entropyReaper er, int level);

The first function queries the verbosity level the reaper is running with. The higher the level, the more verbose its output. The second call allows the level of verbosity to be specified. A level of zero, the default, means no verbose output. All other levels are undefined.

Source Settings

```
    unsigned int NSE_entropy_source_count(void);
    const char *NSE_entropy_source_query_name(unsigned int);
    int NSE_entropy_source_query_usable(NSE_entropySource,
    unsigned int);
```

These query functions return information about the various raw entropy sources. The number of entropy sources can be queried using the NSE_entropy_source_count call. Each source's name can be accessed using the NSE_entropy_source_name call with NULL being returned for out of range indices.

To check if a source is being used, after initialisation is complete, the NSE_entropy_source_query_usable call is made. The function returns non-zero if the source in question is being used.

Active Sources

```
    int NSE_entropy_source_query_active(NSE_entropyReaper er,
    unsigned int n);
    void NSE_entropy_source_set_active(NSE_entropyReaper er,
    unsigned int n, int active);
```

These functions allow the determination and setting of a source's active flag. An active source will be started on initialisation, however not all active sources will necessarily be usable on every machine so it is possible for an active source to not be usable. The NSE_entropy_source_query_usable call is used to determine the latter.

Buffer Size

```
size_t NSE_entropy_source_query_buffer_size(NSE_entropyReaper
er, unsigned int n);
void NSE_entropy_source_set_buffer_size(NSE_entropyReaper er,
unsigned int n, size_t bs);
```

These functions allow the source's collection buffer to be sized and queries. For most sources the collection buffer can be of arbitrary size, however for some sources the collection buffer is immutable and any changes made via these calls will be ignored.

Pool Size

```
signed int
NSE_entropy_source_query_pool_size(NSE_entropyReaper er,
unsigned int n);
void NSE_entropy_source_set_pool_size(NSE_entropyReaper er,
unsigned int n, signed int pool_size);
```

These functions allow the entropy pool buffer size to be specified per source. A pool size of zero means no extra buffering stage. A negative pool size causes the system to calculate a pool size based on the global target buffer size and the entropy quality of the source. A positive pool size will be used as a secondary landing point between the collection buffer and the output whitening stage.

Entropy Quality

```
double
NSE_entropy_source_query_entropy_quality(NSE_entropyReaper er,
unsigned int n);
void NSE_entropy_source_set_entropy_quality(NSE_entropyReaper
er, unsigned int n, double quality);
```

These calls allow the quality out output from a source to be queries and modified. The quality parameter is a real number in the range [0, 1]. A value of 0 meaning no entropy per bit and a value of 1 being full entropy per bit.

Not all sources use the quality parameter as a measure of their implied entropy, the limits below can also be used for this purpose.

Scheduling Interval

```
double NSE_entropy_source_query_scheduling_interval(NSE_entropyReaper er, unsigned int n);
void NSE_entropy_source_set_scheduling_interval(NSE_entropyReaper er, unsigned int n, double interval);
```

The scheduling interval is the nominal time between sampling of an entropy source. Each source will typically have its own unique scheduling interval. These functions allow the scheduling interval for a particular source to be queried and updated.

Entropy Limits

```
void NSE_entropy_source_query_entropy_limits(NSE_entropyReaper er, unsigned int n, unsigned int *low, unsigned int *high);
NSE_entropy_source_set_entropy_limits(NSE_entropyReaper er, unsigned int n, unsigned int low, unsigned int high);
```

Some entropy sources limit the amount of entropy they will accept on an update. Specifically, the number of bits that have changed must be at least the low threshold and it is trimmed to the high threshold. These calls allow these limits to be queried and specified. In the former call, either of the pointer arguments can be NULL and in that case that parameter isn't returned. The latter call allows the limits to be adjusted. Passing a zero value for a limit leaves the setting unchanged.

Fast Health Checks

```
int NSE_entropy_source_query_fast_health_checks(NSE_entropyReaper er, unsigned int n);
```

This query function returns non-zero if the specified entropy source is capable of fast path start up health checks. A source which is capable of fast path health checks will be usable immediately. A source that isn't capable must slowly generate the required 4,096 samples before it can contribute to the ongoing entropy collection.

Seeding

On initialisation, the reaper attempts to gather low entropy system distinguishing information. The sources used for this can be selectively or globally disabled. As with all initialisation parameters, they can only be modified before reaper initialisation.

Global Seeding Setting

```
int NSE_entropy_query_seed(NSE_entropyReaper er);
void NSE_entropy_set_seed(NSE_entropyReaper er, int state);
```

The former call queries the current seeding state. A non-zero return value indicates that seeding will be performed. The latter call allows the seeding to be global enabled when state is non-zero or disabled when state is zero.

By default, seeding is enabled.

Querying Seed Sources

```
int NSE_entropy_seed_count(void);
const char *NSE_entropy_seed_name(unsigned int n);
```

The former call returns the number of seed sources that are available. The latter call returns the name of a specific numbered seed. It returns NULL if the parameter is out of range.

Activating Seed Sources

```
int NSE_entropy_seed_query_active(NSE_entropyReaper er, unsigned int n);
void NSE_entropy_seed_set_active(NSE_entropyReaper er, unsigned int n, int enable);
```

The former call returns non-zero if the indicated seed is currently active. The latter call allows the indicated seed to be enabled or disabled.

By default, all seed sources are enabled.

How to Use the Module

The entropy module is designed to be straightforward and non-invasive to integrate into another application. It may operate best when serviced by its own thread, however it will also work in an unthreaded environment without issue.

It will also be possible to create multiple instances of the entropy module within a single process, each feeding a different entropy pool. However, there are no guarantees about correlation of the resulting outputs.

Threading

To service the entropy subsystem from a separate thread, there should be code along the lines of this:

```
#include <math.h>
#include <time.h>
#include <nse_entropy.h>
...
NSE_config config = NSE_config_new( );
...
NSE_entropySource sources = NSE_entropy_new(config, &openSSL_add_function, NULL)
NSE_config_free(config);
if (sources == NULL)
FAIL;
...
for (;;) {
const double d = NSE_entropy_update(sources);
if (d > 0) {
struct timespec ts;
ts.tv_sec = trunc(d);
ts.tv_nsec = 1e9 * (d - ts.tv_sec);
nanosleep(&ts, NULL);
}
}
...
NSE_entropy_free(sources);
```

Non-Threading

To use the entropy module in a non-threaded environment, the same calls need to be made as the threading example, but these need to be integrated into the application's event loop. It is not necessary to honour the wait time returned from NSE_entropy_update, you are free to call this more or less often but it must be called regularly. A minimal set of code is:

```
#include <nse_entropy.h>
...
NSE_entropySource sources = NSE_entropy_new(NULL, &RAND_add, &RAND_bytes);
...
/* In your main loop */
while (NSE_entropy_update(sources) == 0);
...
NSE_entropy_free(sources);
```

This code doesn't sleep based on the time returned from NSE_entropy_update so it will possibly be quite inefficient.

Small Working Threaded Example Code

The calling code can avoid the NSE_config subsystem entirely and instead rely on the defaults:

```
#include <nse_entropy.h>
#include <time.h>
#include <math.h>
#include <pthread.h>
static void *nse_entropy(void *a) {
    NSE_entropySource sources = (NSE_entropySource)a;
    for (;;) {
        const double d = NSE_entropy_update(sources);
        if (d > 0) {
            struct timespec ts;
            ts.tv_sec = trunc(d);
            ts.tv_nsec = 1e9 * (d - ts.tv_sec);
            nanosleep(&ts, NULL);
        }
    }
    return NULL;
}
int main(int argc, char *argv[ ]) {
    NSE Entropy Module Page 17 of 35
    pthread_t nse_thread;
    NSE_entropySource sources = NSE_entropy_new(NULL, &RAND_add, &RAND_bytes);
    ...
    pthread_create(&nse_thread, NULL, &nse_entropy, sources);
    ...
    pthread_cancel(nse_thread);
    NSE_entropy_free(sources);
    return 0;
}
```

Recommendations

1. Entropy demons should be run where possible feeding into the kernel. The exact choice of demons is left unspecified. Ideally, several would be run in parallel.

2. One should support in CPU hardware random number sources but disable them by default. While these sources are very fast and can produce prodigious amounts of entropy, some people have concerns about their trustworthiness. It will be left up to the end user to decide if they are going to place their trust in a black box source or not.

3. Both /dev/random and /dev/urandom shall be supported if available. /dev/random will be disabled by default due to its blocking nature but should be enabled for systems where there is adequate hardware entropy available. Instead, /dev/urandom will be used by default due to its higher generation rate, however no entropy will be counted as coming from this source unless overridden by the calling application. On systems that support the calls, getentropy(2) and getrandom (2) will be used in the same manner and as a replacement for /dev/random and /dev/urandom respectively.

Entropy Sources

The entropy daemon provides for a number of different individual entropy sources and these each produce entropy pools that are forwarded to OpenSSL for mixing and whitening. Each of the sources has several options which allow for fine tuning and wholesale changing of their behaviour.

Once the pool contains sufficient entropy, it is forwarded to OpenSSL and the entropy estimate is reduced by a factor of the entropyQuality parameter.

Global

| Parameter | Default | Description |
| --- | --- | --- |
| bufferSize | 33 | Bytes of entropy per send. Open SSL in FIPS mode only benefits from 16 bytes. Non-FIPS mode 20 is the usual but it can be usefully as large as 64 bytes depending on the particular random generator chosen. We use 33 because it is prime with reduces the chance of unhappy frequency harmonics. |
| Cache Sample Rate | 2 | When using a digest with the output cache, this parameter specifies the degree of over-sampling that occurs. By default, twice as many bits of entropy need to be presented to the digest as there are bits of output from the digest. This parameter cannot be set to less than unity. |
| Cache Size | 1024 | Number of bytes in the output cache. This cache is used to fulfil requests for entropy. Setting the size to zero passes all generated entropy directly to the overflow function, setting the size negative does the same but skips the whitening step. |
| Digest | sha512 | The digest to use to whitening the output. |
| Health Checks | no | Run the continuous health checks on the entropy source. These disable sources if their output appears to lose entropy. The cost for including these is a small amount of memory and some extra processing for each source. In addition, the first 4096 samples from each source are used for startup testing, which means no entropy will be produced until after these are processed. |
| Seed | yes | Push seed data into entropy pool. The seed data counts for zero entropy but provides some degree of difference at start up. |
| Skew Interval | 12 | Time between randomisations of the time skew coefficient. The new scale factor is in place globally until this time period has again elapsed. |
| Skew Percent | 5% | Percentage of time interval skewing permitted. This setting is used to slightly randomise the collection times for the various entropy sources. The source time interval is never reduced but can be increased by up to this percentage. |
| Verbose | no | Print informational messages about the entropy pool and the various sources. |

CPU Information

This source returns entropy based on the available CPU(s) status information. It is useful for Solaris, HP-UX and AIX systems. It does nothing on other devices. Linux uses the /proc/timer_list and /proc/interrupts sources instead.

| Parameter | Default | Description |
|---|---|---|
| bufferSize | variable | Bytes of entropy per collect. This is an internal tuning setting, change poolSize instead. |
| enable | yes | Use this source or not. |
| entropyQuality | 1.00 | Entropy per bit credited to the entropy pool. |
| interval | variable | Seconds between gatherings. |
| maxEntropy | variable | Maximum amount of entropy that can be credited per collection. |
| minEntropy | variable | Amount of entropy below which we ignore a collection. |
| poolSize | variable | The size of the local entropy accumulation pool. |

The variable parameters here are determined empirically and their default values are based on the hosting operating system:

| OS | bufferSize | interval | maxEntropy | minEntropy | poolSize |
|---|---|---|---|---|---|
| AIX | 5 | 1.13 | 38 | 1 | 50 |
| HP-UX | 5 | 1.13 | 38 | 1 | 50 |
| Solaris | 5 | 1.13 | 38 | 1 | 50 |

The numbers here are all identical. This means that further system specific tuning may be required.

Currently, different versions of a single operating system are treated identically. If future data indicates that this isn't ideal, specialisation may be required.

Memory Information

This source is defined for AIX and FreeBSD platforms and examines instantaneous physical and virtual memory usage. Linux uses the /proc/meminfo source to gather similar information.

| Parameter | Default | Description |
|---|---|---|
| enable | yes | Use this source or not. |
| entropyQuality | variable | Entropy per bit credited to the entropy pool. |
| interval | variable | Seconds between gatherings. |
| poolSize | variable | The size of the local entropy accumulation pool. |

The variable parameters here are determined empirically and their default values are based on the hosting operating system:

| OS | entropyQuality | interval | poolSize |
|---|---|---|---|
| AIX | 7.50 | 4.9 | 36 |
| FreeBSD | 0.00 | 5.9 | 115221 |

Different versions of a single operating system can be treated identically. If future data indicates that this isn't ideal, specialisation may be required.

As it currently stands, this source does not appear to be worthwhile for FreeBSD machines. However, this data is from an unrefined partial collection on an otherwise idle virtual machine. There is plenty of scope for improvement going forwards.

Network Information
Section Network

This source is defined for the FreeBSD platform and examines the traffic statistics on the network interfaces. Linux uses the /proc/net/dev source to gather similar information.

| Parameter | Default | Description |
|---|---|---|
| bufferSize | 5 | Bytes of entropy per collect. This is an internal tuning setting, change poolSize instead. |
| enable | yes | Use this source or not. |
| entropyQuality | 1.00 | Entropy per bit credited to the entropy pool. |
| interval | 2.222 | Seconds between gatherings. |
| maxEntropy | 10 | Maximum amount of entropy that can be credited per collection. |
| minEntropy | 1 | Amount of entropy below which we ignore a collection. |
| poolSize | 165 | The size of the local entropy accumulation pool. |

Time
Section Time

This source returns entropy based on a high resolution clock. It is useful on all platforms and the clock used varies per platform. On all platforms, this sources emits a single byte per sampling.

| Parameter | Default | Description |
|---|---|---|
| enable | yes | Use this source or not. |
| entropyQuality | variable | Entropy per bit credited to the entropy pool. |
| interval | variable | Seconds between gatherings. |
| poolSize | variable | The size of the local entropy accumulation pool. |

The variable parameters here are determined empirically and their default values are based on the hosting operating system:

| OS | entropyQuality | interval | poolSize |
|---|---|---|---|
| AIX | 7.80 | 0.1370 | 33 |
| FreeBSD | 7.50 | 0.1287 | 33 |
| HP-UX | 7.80 | 0.1370 | 33 |
| Linux | 7.50 | 0.1287 | 33 |
| Solaris | 7.80 | 0.1370 | 33 |
| Windows | 6.18 | 1.6626 | 33 |
| Other | 6.00 | 2.2427 | 99 |

Currently, different versions of a single operating system are treated identically. If data indicates that this isn't ideal, specialisation may be required. The other row is for systems that go not support the clock_gettime(2) system call and consequently fall back to lower resolution the gettimeofday(2) call instead.

IO

Defined for AIX, HP-UX, Solaris and Windows. Linux uses the /proc/diskinfo source instead.

| Parameter | Default | Description |
|---|---|---|
| bufferSize | variable | Bytes of entropy per collect and send. |
| enable | yes | Use this source or not. |
| entropyQuality | 1 | Entropy per bit credited to the entropy pool. |
| interval | variable | Seconds between gatherings. |
| maxEntropy | variable | Maximum amount of entropy that can be credited per collection. |

-continued

| Parameter | Default | Description |
| --- | --- | --- |
| minEntropy | variable | Amount of entropy below which we ignore a collection. |
| poolSize | variable | The size of the local entropy accumulation pool. |

The variable parameters here are determined empirically and their default values are based on the hosting operating system:

| OS | bufferSize | interval | minEntropy | maxEntropy | poolSize |
| --- | --- | --- | --- | --- | --- |
| AIX | 3 | 10.000 | 2 | 14 | 69 |
| HP-UX | 3 | 10.000 | 3 | 8 | 114 |
| Solaris | 14 | 11.913 | 1 | 16 | 294 |

Currently, different versions of a single operating system are treated identically. If data indicates that this isn't ideal, specialisation may be required.

PRNG

Defined for Intel x86 platforms using the RDRAND instruction. It is disabled by default due to concerns about the RDRAND instruction. These concerns are two fold: it is possible that the instruction does not generate quality entropy despite claiming to and it is possible that the instruction compromises existing entropy in the pool as part of its operation. However, this is by far the fastest source of entropy available on the machine, so if your requirements for entropy are very high and you are unconcerned about the black box nature of the entropy, enable this source.

| Parameter | Default | Description |
| --- | --- | --- |
| bufferSize | 8 | Bytes of entropy per collect and send. |
| enable | no | Use this source or not. |
| entropyQuality | 1.00 | Entropy per bit credited to the entropy pool. |
| fast health | yes | Can fast power on health test be performed for this source. |
| interval | 0.15 | Seconds between gatherings. |
| poolSize | 40 | The size of the local entropy accumulation pool, zero means no local accumulation. |

HRNG

Defined for Intel x86 platforms using the RDSEED instruction. It is disabled by default due to concerns about the RDSEED instruction. The exact same concerns apply as do for RDRAND. RDSEED is recommended over RDRAND for the purposes of seeding entropy pools for PRNGs as we are doing. Thus, RDSEED should be preferred over RDRAND if one is to be enabled.

| Parameter | Default | Description |
| --- | --- | --- |
| bufferSize | 8 | Bytes of entropy per collect and send. |
| enable | no | Use this source or not. |
| entropyQuality | 1.00 | Entropy per bit credited to the entropy pool. |
| fast health | yes | Can fast power on health test be performed for this source. |
| interval | 0.25 | Seconds between gatherings. |
| poolSize | 40 | The size of the local entropy accumulation pool, zero means no local accumulation. |

Instruction Counter

This module may only be useful on Itanium and SPARC platforms and x86 processors with the TSC instruction. Both the Itanium's ITC and the x86's TSC registers provide an instruction cycle counter. In the presence of an operating system and other tasks, this provides a moderate amount of entropy in the low order bits.

| Parameter | Default | Description |
| --- | --- | --- |
| enable | yes | Use this source or not. |
| entropyQuality | 0.975 | Entropy per bit credited to the entropy pool. |
| fast health | yes | Can fast power on health test be performed for this source. |
| interval | variable | Seconds between gatherings. |
| poolSize | variable | The size of the local entropy accumulation pool. |

The variable parameters here are determined empirically and their default values are based on the hosting operating system:

| OS | Interval | Pool Size |
| --- | --- | --- |
| ia64 | 0.13 | 34 |
| SPARC | 0.25 | 34 |
| x86 | 0.13 | 34 |

Currently, different versions of a single operating system are treated identically. If data indicates that this isn't ideal, specialisation may be required.

/dev/random

The sources reads from the UNIX and Linux kernel entropy pool. Because this pool is often blocking, the defaults are to read only a very small amount of entropy very infrequently. If the host system is configured to provide a lot of quality entropy via this source, e.g. via a hardware random number generator or haveged, the buffer size can be markedly increased and the interval decreased.

| Parameter | Default | Description |
| --- | --- | --- |
| bufferSize | 1 | Bytes of entropy per collection. |
| enable | no | Use this source or not. |
| entropyQuality | 1.00 | Entropy per bit credited to the entropy pool. |
| interval | 15 | Seconds between gatherings. |
| poolSize | 33 | The size of the local entropy accumulation pool. |

/dev/urandom

This source provides a pseudo random number generator on Linux and UNIX systems. Because there is no guarantee about the quality of the entropy pool underlying this source, it isn't credited with supplying any entropy.

| Parameter | Default | Description |
| --- | --- | --- |
| bufferSize | 33 | Bytes of entropy per collection. |
| enable | no | Use this source or not. |
| entropyQuality | 0.00 | Entropy per bit credited to the entropy pool. |
| interval | 2 | Seconds between gatherings. |
| poolSize | 0 | The size of the local entropy accumulation pool, zero means no local accumulation. |

/dev/srandom

The BSD specific source reads from kernel entropy pool. Because this pool is often blocking, the defaults are to read only a very small amount of entropy very infrequently. If the host system is configured to provide a lot of quality entropy via this source, e.g. via a hardware random number generator or haveged, the buffer size can be markedly increased and the interval decreased.

| Parameter | Default | Description |
|---|---|---|
| bufferSize | 1 | Bytes of entropy per collection. |
| enable | no | Use this source or not. |
| entropyQuality | 1.00 | Entropy per bit credited to the entropy pool. |
| fast health | no | Can fast power on health test be performed for this source. |
| interval | 15 | Seconds between gatherings. |
| poolSize | 33 | The size of the local entropy accumulation pool. |

/dev/prandom

This source provides a pseudo random number generator on Linux/S390 systems. Because there is no guarantee about the quality of the entropy pool underlying this source, it isn't credited with supplying any entropy.

| Parameter | Default | Description |
|---|---|---|
| bufferSize | 33 | Bytes of entropy per collection. |
| enable | no | Use this source or not. |
| entropyQuality | 0.00 | Entropy per bit credited to the entropy pool. |
| fast health | no | Can fast power on health test be performed for this source. |
| interval | 2 | Seconds between gatherings. |
| poolSize | 0 | The size of the local entropy accumulation pool, zero means no local accumulation. | getentropy

This source is the getentropy(2) system call available on OpenBSD, Solaris and Linux.

| Parameter | Default | Description |
|---|---|---|
| bufferSize | 1 | Bytes of entropy per collection. |
| enable | no | Use this source or not. |
| entropyQuality | 1.00 | Entropy per bit credited to the entropy pool. |
| interval | 15 | Seconds between gatherings. |
| poolSize | 33 | The size of the local entropy accumulation pool. | getrandom

This source is the getrandom(2) system call available on Solaris and Linux. It draws from the same entropy pool as the /dev/random and /dev/urandom sources.

| Parameter | Default | Description |
|---|---|---|
| bufferSize | 33 | Bytes of entropy per collection. |
| enable | no | Use this source or not. |
| entropyQuality | 0.00 | Entropy per bit credited to the entropy pool. |
| interval | 2 | Seconds between gatherings. |
| poolSize | 0 | The size of the local entropy accumulation pool, zero means no local accumulation. |

CryptGenRandom

This Windows only source uses the CryptGenRandom cryptographic quality random number generator.

| Parameter | Default | Description |
|---|---|---|
| bufferSize | 33 | Bytes of entropy per collection. |
| enable | no | Use this source or not. |
| entropyQuality | 0.00 | Entropy per bit credited to the entropy pool. |
| interval | 2 | Seconds between gatherings. |
| poolSize | 0 | The size of the local entropy accumulation pool, zero means no local accumulation. |

/proc/diskstats

Linux specific source that uses the disc IO subsystem statistics.

| Parameter | Default | Description |
|---|---|---|
| bufferSize | 16 | Bytes of entropy per collect and send. |
| enable | yes | Use this source or not. |
| entropyQuality | 1.00 | Entropy per bit credited to the entropy pool. |
| interval | 3.3 | Seconds between gatherings. |
| maxEntropy | 9 | Maximum amount of entropy that can be credited per collection. |
| minEntropy | 2 | Amount of entropy below which we ignore a collection. |
| poolSize | 560 | The size of the local entropy accumulation pool. |

/proc/interrupts

Linux specific source that uses the CPU interrupt statistics.

| Parameter | Default | Description |
|---|---|---|
| bufferSize | variable | Bytes of entropy per collect and send. |
| enable | yes | Use this source or not. |
| entropyQuality | 1.00 | Entropy per bit credited to the entropy pool. |
| interval | 0.751 | Seconds between gatherings. |
| maxEntropy | variable | Maximum amount of entropy that can be credited per collection. |
| minEntropy | 2 | Amount of entropy below which we ignore a collection. |
| poolSize | variable | The size of the local entropy accumulation pool. |

The variable parameters here are determined empirically and their default values are based on the hosting processor architecture:

| Processor | BufferSize | maxEntropy | poolSize |
|---|---|---|---|
| ARM | 16 | 9 | 560 |
| S390 | 7 | 2 | 924 |
| other | 8 | 19 | 260 |

Currently, different versions of a processor are treated identically. If data indicates that this isn't ideal, specialisation may be required.

/proc/meminfo

Linux specific source that uses the system memory information.

| Parameter | Default | Description |
|---|---|---|
| bufferSize | variable | Bytes of entropy per collect and send. |
| enable | yes | Use this source or not. |
| entropyQuality | 1.00 | Entropy per bit credited to the entropy pool. |
| interval | 1.27 | Seconds between gatherings. |
| maxEntropy | variable | Maximum amount of entropy that can be credited per collection. |

-continued

| Parameter | Default | Description |
|---|---|---|
| minEntropy | 2 | Amount of entropy below which we ignore a collection. |
| poolSize | variable | The size of the local entropy accumulation pool. |

The variable parameters here are determined empirically and their default values are based on the hosting processor architecture:

| Processor | Buffer Size | maxEntropy | poolSize |
|---|---|---|---|
| ARM | 16 | 3 | 1520 |
| other | 13 | 7 | 572 |

Currently, different versions of a processor are treated identically. If data indicates that this isn't ideal, specialisation may be required.

/proc/net/dev

Linux specific source that uses the network interface statistics.

| Parameter | Default | Description |
|---|---|---|
| bufferSize | variable | Bytes of entropy per collect and send. |
| enable | yes | Use this source or not. |
| entropyQuality | 1.00 | Entropy per bit credited to the entropy pool. |
| interval | 0.715 | Seconds between gatherings. |
| maxEntropy | variable | Maximum amount of entropy that can be credited per collection. |
| minEntropy | 2 | Amount of entropy below which we ignore a collection. |
| poolSize | variable | The size of the local entropy accumulation pool. |

The variable parameters here are determined empirically and their default values are based on the hosting processor architecture:

| Processor | Buffer Size | maxEntropy | poolSize |
|---|---|---|---|
| ARM | 9 | 2 | 1188 |
| other | 5 | 8 | 195 |

Currently, different versions of a processor are treated identically. If data indicates that this isn't ideal, specialisation may be required.

/proc/timer_list

Linux specific source that uses the kernel timer statistics.

| Parameter | Default | Description |
|---|---|---|
| bufferSize | 19 | Bytes of entropy per collect and send. |
| enable | yes | Use this source or not. |
| entropyQuality | 1.00 | Entropy per bit credited to the entropy pool. |
| interval | 0.753 | Seconds between gatherings. |
| maxEntropy | 22 | Maximum amount of entropy that can be credited per collection. |
| minEntropy | 2 | Amount of entropy below which we ignore a collection. |
| poolSize | 285 | The size of the local entropy accumulation pool. |

Windows Process Information

This Windows specific source reads some, but not necessarily all, of the currently executing processes and extracts timing, memory size and IO details from each to create its entropy.

| Parameter | Default | Description |
|---|---|---|
| bufferSize | 17 | Bytes of entropy per collect and send. |
| enable | yes | Use this source or not. |
| entropyQuality | 1.00 | Entropy per bit credited to the entropy pool. |
| interval | 4.4 | Seconds between gatherings. |
| maxEntropy | 15 | Maximum amount of entropy that can be credited per collection. |
| minEntropy | 10 | Amount of entropy below which we ignore a collection. |
| poolSize | 170 | The size of the local entropy accumulation pool. |

User Interface Information

On the Windows platform a source that uses various aspects of the user interface like the cursor position and the current focused window was considered. On a headless server, such a source can produce no meaningful entropy. However, on a workstation it is capable of producing some entropy. Because it must operate at human speeds, the generation rate will be low.

This source was eventually removed from consideration because it is extremely difficult to quantify the generation rate and quality of the entropy it produces. An attempt was made to analyse this source and after a week of data collection, less than 64 kilobytes of raw data had been produced which is insufficient to produce meaningful statistics. Without a reasonable estimate of the quality, the module must conservatively assume a source is producing zero entropy. A source that is very slow and producing no creditable entropy is marginal at best. Hence the decision to not include such a source.

Seed Sources

The initial seeding solicits information from various parts of the system and pushes them into the entropy buffer. These are typically not good sources of entropy but they do serve to distinguish between devices. To account for this, we assume zero entropy is received during this stage. The true entropy sources will also be used during initialisation to try to have some entropy, although they often can take some time to become effective.

Unix Seed Sources
sysconf(_SC_CHILD_MAX)
sysconf(_SC_STREAM_MAX)
sysconf(_SC_OPEN_MAX)
sysconf(_AES_OS_VERSION)
sysconf(_SC_CPU_VERSION)
sysinfo(SI_MACHINE)
sysinfo(SI_RELEASE)
sysinfo(SI_HW_SERIAL)
file: /etc/passwd
file: /etc/utmp
file: /tmp
file: /var/tmp
file: /usr/tmp
file: getenv("NSRANDFILE") length=getenv("NSRANDCOUNT")
file: /dev/urandom
process environment
host name
pid
ppid
gid egid
uid
euid
date/time
Windows Seed Sources
GlobalMemory Status
GetLogicalDrives
GetComputerName
GetCurrentProcess
GetCurrentProcessId
GetCurrentThreadId
GetVolumeInformation
GetDiskFreeSpace
Registry seed key Configuration of Seed Sources The configuration system allows for the larger and more time consuming seed sources to be selectively disabled by setting values in the seed section. In general, there is no need to alter the default settings for the seed sources.

There are also a number of lightweight fast seed sources that cannot be disabled. These include the time of day, high speed timers, the system's host name, various system and process ids.

| Seed | Default | System | Description |
| --- | --- | --- | --- |
| arp | enabled | Linux | Reads the network address resolution table. |
| cryptgenrandom | enabled | Windows | Seeds from the system entropy source. |
| directories | enabled | Unix† | Reads the file names in a number of system directories. |
| disk_space | enabled | Windows | Free disc space. |
| environment | enabled | Unix† | Reads the processes environement variables. |
| getentropy | disabled | Unix† | Uses the system entropy source as a seed. |
| getrandom | disabled | Unix† | Uses the system pseudo random generator as a seed. |
| hostname | enabled | all | The system's host and domain name are used for seeding. |
| id | enabled | all | Various process and user IDs are used as seed input. |
| if_inet6 | enabled | Linux | Seeds using the IPv6 interface details. |
| instr_ctr | enabled | Itanium, x86 & Sparc | CPU's instruction counter is treated as seed material. |
| kstat | enabled | Solaris | Loads all of the kernel statistics as a seed source. |
| loadavg | enabled | Linux | Uses the system's load average. |
| mem_status | enabled | Windows | Seeds with the system's global memory status. |
| network | enabled | Linux & Solaris | Seeds using the network interface addresses. |
| passwd | enabled | Unix† | Uses the system password file (without passwords). |
| time | enabled | all | |
| random | disabled | Unix† | Reads seed material from /dev/random. |
| rdrand | enabled | x86 | Uses the x86 RDRAND generator for seed material. |
| rdseed | enabled | x86 | Uses the x86 RDSEED generator for seed material. |
| registery | enabled | Windows | Loads several entropy related registry settings. |
| sockstat | enabled | Linux | Read system wide socket statistics. |
| srandom | disabled | Unix† | Reads seed material from /dev/srandom. |
| swaps | enabled | Linux | Uses the current swap space statistics as seed material. |
| sysconf | enabled | Unix† | Loads a number of sysconf(3) settings. |
| sysinfo | enabled | Unix† | Loads a number of sysinfo(2) settings. |
| unix | enabled | Linux | Queries the status of Unix sockets on the system. |
| urandom | enabled | Unix† | Reads seed material from /dev/uandom. |
| vmstat | enabled | Linux | Loads the virtual memory statistics as a seed source. |
| volume_info | enabled | Windows | Uses system's volume information as a seed source. |

†Unix systems also include Linux.

Kernel Entropy Sources

A number of different sources are available to gather entropy which is directly input into the operating system's entropy pool. It is beneficial to run one or several of these sources to provide additional entropy sources beyond what the kernel normally provides. There is no harm having more sources and they might just help. These sources are all low resource use.

HAVEGE

HAVEGE obtains entropy from the unknown and knowable internal CPU state by means of a high speed timer. This should be used as an entropy source on all platforms, if the process can be successfully launched. We can take the feed either via /dev/random or via a direct pipe to the process. Generally, the former is the better alternative since it provides entropy to everything on the system that requires it.

Currently HAVEGE is supported directly for x86, ia64, PowerPC, IBM S390 and SPARC. On other platforms, it will fall back to using gettimeofday(2) which will still be functional but is unlikely to be quite so efficient.

There have been concerns raised about the expansion portion of HAVEGE whitening the output making it indistinguishable from true entropy regardless of the underlying quality. The crush and bigcrush tests from TestU01 are capable of distinguishing the output of a modified HAVEGE from pure entropy when presented with a sample size of $10^9$ bytes. The modification replaces the high speed timer with a function that returns a constant. The conclusion is that the expansion is not producing cryptographic quality whitening.

However, HAVEGE is expanding the entropy it receives from the timer. For each thirty two bytes of output, the HAVEGE algorithm samples the timer once. Moreover, the timer is sampled in rapid succession and thus produces a relatively low entropy per sample of 2.4 bits. Thus, each byte of output possesses slightly more than 0.0625 bits of entropy.

CPU Jitter Random Number Generator

The CPU Jitter Random Number Generator works on a similar principle to HAVEGE, it relies on the complex hidden internal state of modern CPUs to provide timing jitter which is then used to produce entropy. The major difference between the two is that HAVEGE actively attempts to exercise the code and data caches, the branch predictors and the translation lookaside buffers. The CPU Jitter Random Number Generator, instead, passively measures the internal CPU state.

TURBID

Turbid generates entropy from a floating input on an audio device. It has a provable minimum level of entropy based on Johnson-Nyquist noise. We do not accept direct input from this demon, instead we would rely on it pushing entropy in /dev/random. It is recommended that this demon run on all systems that have an unused audio input. Failing that, one of the other floating audio input entropy sources should be used if possible.

MAXWELL

Maxwell generates entropy from timing jitter after a short sleep. It is very lightweight, conservatively designed and outputs the generated entropy to /dev/random. This source attempts to mix and whiten the bits it outputs which has the potential to obscure the true entropy present. It is recommended that this demon, or another time jitter based source, be run on all suitable systems.

RANDOMSOUND

Randomsound gathers entropy from a floating audio input as does Turbid above. However, no attempt is made to quantify the minimum level of entropy gained. There will, of course, still be a provable minimum level but the estimate provided to the kernel isn't based on mathematical foundations.

Clock Randomness Gathering Daemon

The clock randomness gathering daemon uses fluctuations between different between physical highfrequency clocks to generate entropy. Given that each of the time bases will jitter, presumably independently, this could be a better source of entropy than a single time source. The source code for this daemon appears to have gone missing and this project is presumably dead.

Audio Entropy Daemon

The audio entropy daemon is another source that uses a floating analogue audio input like RANDOMSOUND and TURBID. Like RANDOMSOUND, no attempt is made to theoretically quantify the entropic minima being generated.

Timer Entropy Daemon

The timer entropy daemon uses timing jitters over sleeps to produce entropy, much like MAXWELL. This demon is even more lightweight than MAXWELL, and makes no attempt to spice things up by doing small calculations, rather it only uses a 100 s sleep wrapped by gettimeofday(2) sampling.

Video Entropy Daemon

The video entropy demon uses the difference between frames from a video capture device as its entropy source. The quality of the entropy will depend on the turning of the video capture and if the capture is analogue or digital. Ideally, an detuned analogue capture would be used but with digital television become dominant, such hardware is unlikely to reach the same commodity level as audio inputs have.

NOISE

The NOISE entropy source uses high resolution timings of various interrupt sources (key presses, disc IO, . . . ) with a whitening and mixing step. This source is coded completely in x86 assembly code and was written as a device driver for DOS systems. It is likely too old to be practical.

Sources by Operating System

The primary and secondary sources of entropy for each of the operating systems are listed below. More specific details about the individual configuration for each source is detailed above.

Linux

| | |
|---|---|
| Primary | High speed timers |
| | /dev/random or getentropy(2) |
| Secondary | /proc/timer_list |
| | /proc/interrupts |
| | /proc/meminfo |
| | /proc/net/dev |
| | /proc/diskstats |
| | sysinfo(2) |
| | gettimeofday(2) |
| Disabled | RDRAND (x86 specific) |
| | RDSEED (x86 specific) |

Solaris

| | |
|---|---|
| Primary | High speed timers |
| | /dev/random or getentropy(2) |
| Secondary | Kernel IO statistics |
| | Kernel CPU status |
| Disabled | RDRAND (x86 specific) |
| | RDSEED (x86 specific) |

Windows

| | |
|---|---|
| Primary | CryptGenRandom |
| Secondary | QueryPerformanceCounter |
| | IO statistics |
| | Process timing information |
| | User interface data |
| | Current processes |
| Disabled | RDRAND (x86 specific) |
| | RDSEED (x86 specific) |

Other Unix

| | |
|---|---|
| Primary | System entropy sources |
| | High resolution timers |
| Secondary | IO information |
| | Memory usage data |
| | CPU statistics |
| | Real time clock |

Glossary of Terms

| Term | |
|---|---|
| AIX | IBM's UNIX family operating system. |
| ANSI | American National Standards Institute |
| API | Application Programming Interface |
| BigCrush | The most comprehensive test suite from the TestU01 library. |
| BSAFE | RSA's TLS stack |
| CPU | Central processing Unit |
| CPUID | Intel's x86 processors provide a mechanism to query the architectural features present using the CPUID instruction. |
| CRNGT | Continuous Random Number Generator Testing |
| Crush | A large and comprehensive test suite from the TestU01 library. |
| Dieharder | A testing and benchmarking tool for random number generators. |
| Ent | Pseudo-random number sequence test tool. |
| Entropy | A measure of possible patterns present within random data. Entropy can be a random string which has no shorter description than the string itself (Kolmogorov complexity) |

-continued

| Term | |
|---|---|
| FIPS | Federal Information Processing Standard. More specifically FIPS 140-2 and FIPS 180-4. |
| GF(2) | Galois field with two elements. |
| HAVEG | HArdware Volatile Entropy Gathering |
| HAVEGE | HArdware Volatile Entropy Gathering and Expansion |
| HP-UX | Hewlett Parkard's UNIX family operating system. |
| ia64 | Intel Itanium architecture. |
| IBM S390 | I B M mainframe computer. |
| IID | Independently and Identically Distributed used with respect to random variables. |
| IO | Input/Output |
| Itanium | Intel CPU architecture, mostly used in HP-UX machines. |
| ITC | Interval Time Counter, a register on Itanium processors. |
| LIL | Law of Iterated Logarithms, used as a statistical test of distribution to test sources of randomness. |
| Linux | Open source UNIX like operating system. |
| NIST | National Institute of Standards and Technology |
| NSE | Network Security and Encryption |
| NULL | A C pointer value that represents not pointing at anything. |
| OpenSSL | Premier open source TLS stack. |
| OS | Operating System |
| PowerPC | CPU architecture used by IBM. |
| PRNG | Pseudo Random Number Generator |
| RDRAND | x86/i64 PRNG instruction that generates random numbers. |
| RDSEED | x86/i64 entropy generation instruction which is suitable for seeding PRNGs. |
| Solaris | Oracle's UNIX family operating system. |
| SPARC | Oracle's CPU for some lines of the Solaris business. |
| TestU01 | A software library in ANSI C for Empirical testing of Random Number Generators. |
| TLS | Transport Layer Security |
| TSC | x86/i64 instruction to access a very high speed counter. |
| UNIX | Multitasking, multi-user operating system. |
| Whitening | A cryptographic technique using a de-correlating transformation to produce a more white noise like result. |
| Windows | Microsoft's desktop and server operating system. |
| x86 | Intel's primary desktop and server CPU architecture. |

Flow Charts

Figure 5:
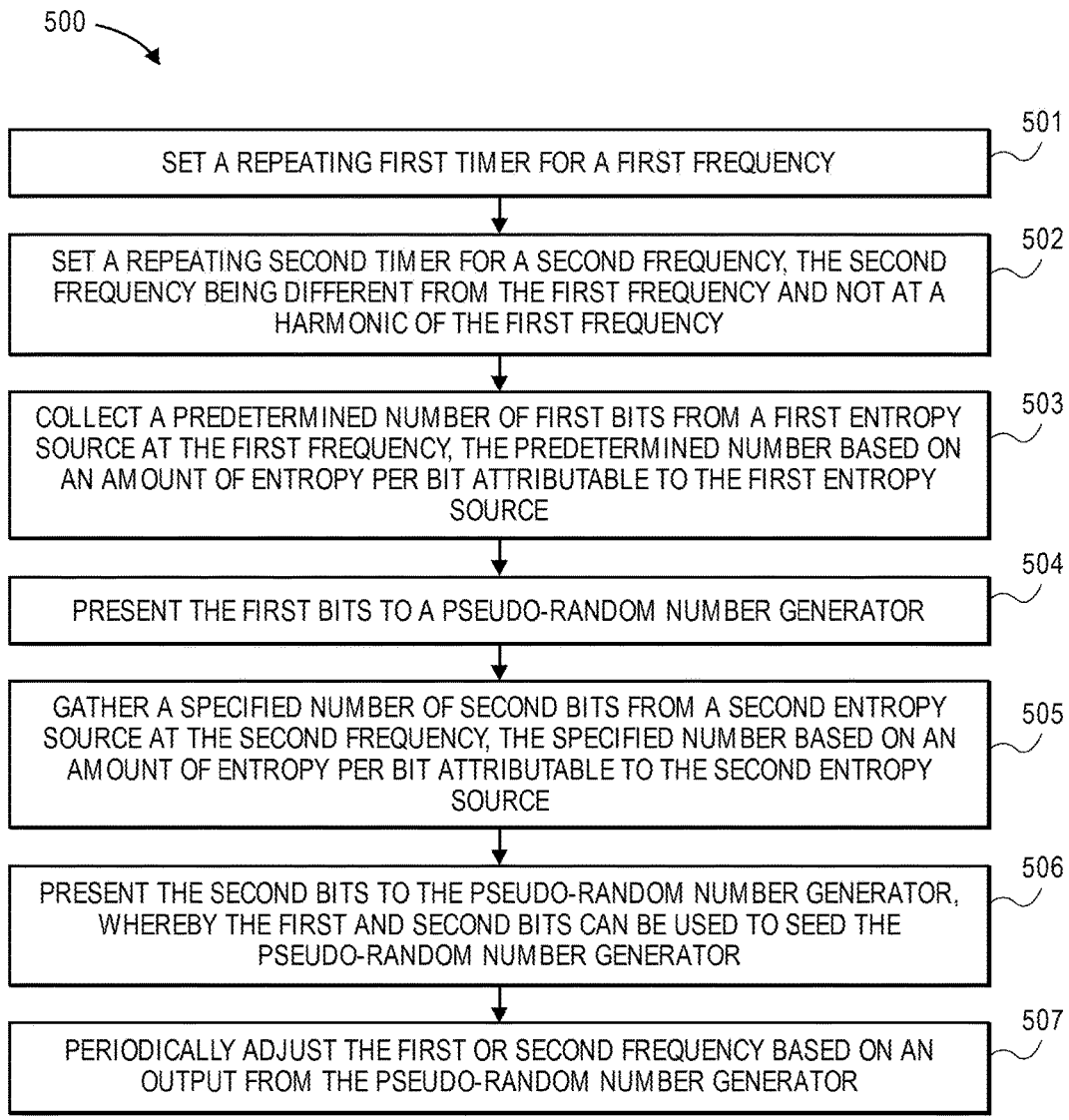
FIG. 5 is a flowchart illustrating a process in accordance with an embodiment.

FIG. 5 is a flowchart illustrating process 500 in accordance with an embodiment. The process can be implemented by computer by executing instructions in a processor or otherwise. In operation 501, a repeating time for a first frequency is set. In operation 502, a repeating second timer for a second frequency is set, the second frequency being different from the first frequency and not, in this case, at a harmonic of the first frequency. In operation 503, a predetermined number of first bits from a first entropy source are collected at the first frequency, the predetermined number based on an amount of entropy per bit attributable to the first entropy source. In operation 504, the first bits are presented to a pseudo-random number generator. In operation 505, a specified number of second bits from a second entropy source are gathered at the second frequency, the specified number based on an amount of entropy per bit attributable to the second entropy source. In operation 506, the second bits are presented to the pseudo-random number generator. The first and second bits can be used to seed the pseudo-random number generator. In operation 507, the first and/or second frequency is periodically adjusted based on an output from the pseudo-random number generator.

Figure 6:
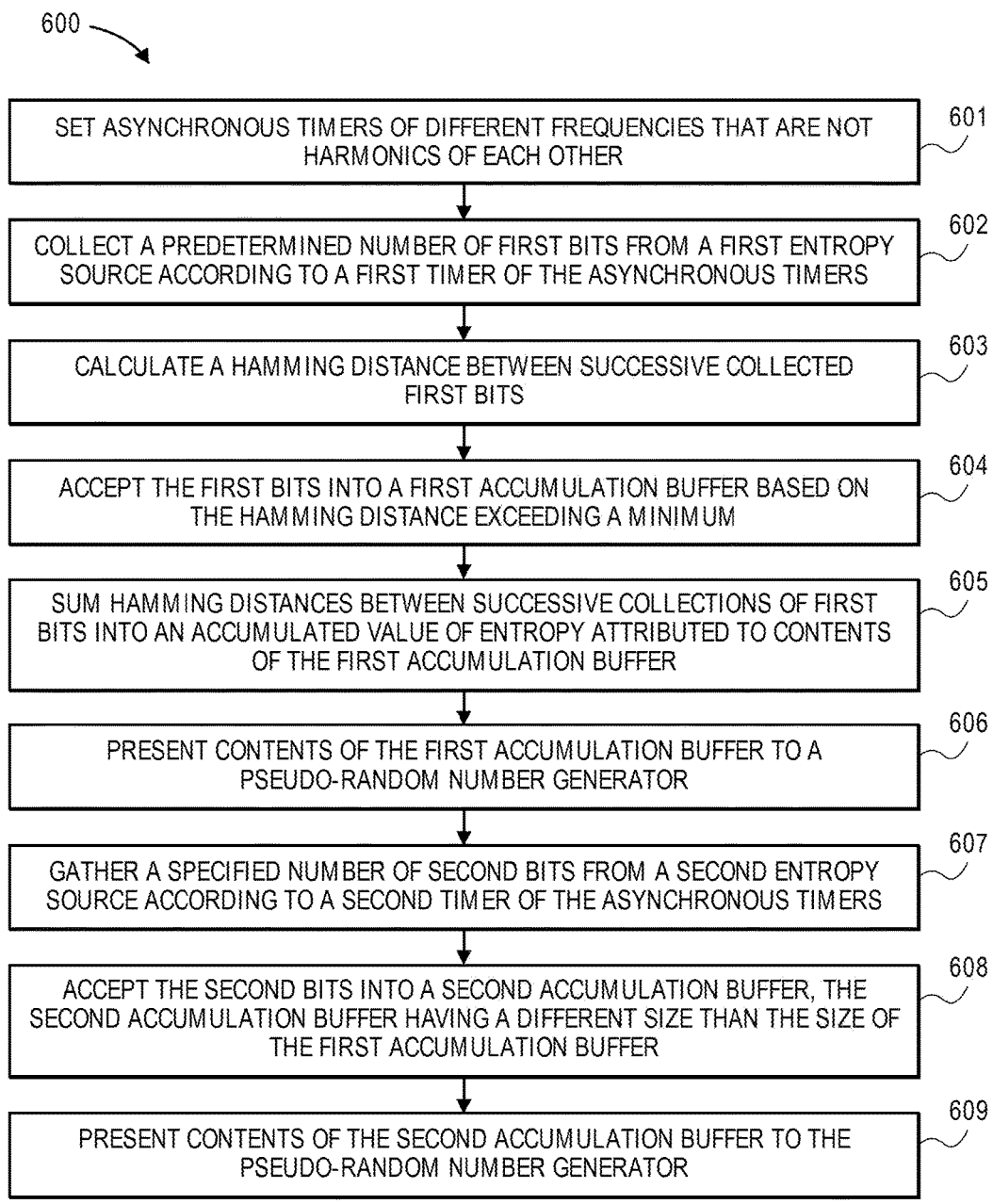
FIG. 6 is a flowchart illustrating a process in accordance with an embodiment.

FIG. 6 is a flowchart illustrating process 600 in accordance with an embodiment. The process can be implemented by computer by executing instructions in a processor or otherwise. In operation 601, asynchronous timers of different frequencies from one another that are not, in this case, harmonics of each other are set. In operation 602, a predetermined number of first bits from a first entropy source are collected according to a first timer of the asynchronous timers. In operation 603, a Hamming distance is calculated between successive collected first bits. In operation 604, the first bits are accepted into a first accumulation buffer based on the Hamming distance exceeding a minimum. In operation 605, Hamming distances between successive collections of first bits are summed into an accumulated value of entropy attributed to contents of the first accumulation buffer. In operation 606, contents of the first accumulation buffer are presented to a pseudo-random number generator. In operation 607, a specified number of second bits from a second entropy source are gathered according to a second timer of the asynchronous timers. In operation 608, the second bits are accepted into a second accumulation buffer, the second accumulation buffer having a different size than a size of the first accumulation buffer. In operation 609, the contents of the second accumulation buffer are presented to the pseudo-random number generator.

Computing Equipment

Figure 7:
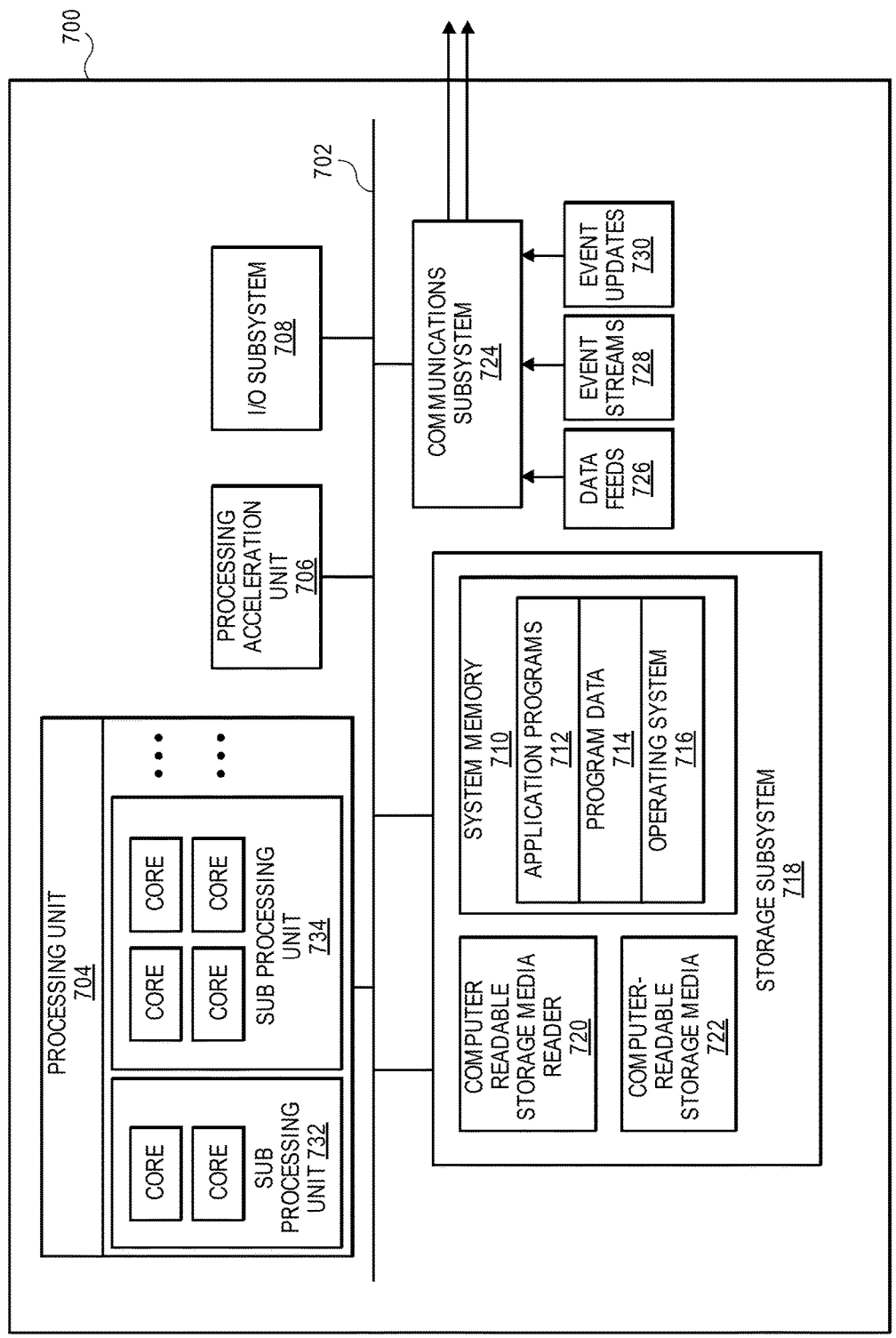
FIG. 7 illustrates an exemplary computer system, in which various embodiments of the present invention may be implemented.

FIG. 7 illustrates an exemplary computer system 700, in which various embodiments of the present invention may be implemented. The system 700 may be used to implement any of the computer systems described above. As shown in the figure, computer system 700 includes a processing unit 704 that communicates with a number of peripheral subsystems via a bus subsystem 702. These peripheral subsystems may include a processing acceleration unit 706, an I/O subsystem 708, a storage subsystem 718 and a communications subsystem 724. Storage subsystem 718 includes tangible computer-readable storage media 722 and a system memory 710.

Bus subsystem 702 provides a mechanism for letting the various components and subsystems of computer system 700 communicate with each other as intended. Although bus subsystem 702 is shown schematically as a single bus, alternative embodiments of the bus subsystem may utilize multiple buses. Bus subsystem 702 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 704, which can be implemented as one or more integrated circuits (e.g., a conventional microprocessor or microcontroller), controls the operation of computer system 700. One or more processors may be included in processing unit 704. These processors may include single core or multicore processors. In certain embodiments, processing unit 704 may be implemented as one or more independent processing units 732 and/or 734 with single or multicore processors included in each processing unit. In other embodiments, processing unit 704 may also be implemented as a quad-core processing unit formed by integrating two dual-core processors into a single chip.

In various embodiments, processing unit 704 can execute a variety of programs in response to program code and can maintain multiple concurrently executing programs or processes. At any given time, some or all of the program code to be executed can be resident in processor(s) 704 and/or in storage subsystem 718. Through suitable programming, processor(s) 704 can provide various functionalities described above. Computer system 700 may additionally include a processing acceleration unit 706, which can include a digital signal processor (DSP), a special-purpose processor, and/or the like.

I/O subsystem 708 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 700 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 700 may comprise a storage subsystem 718 that comprises software elements, shown as being currently located within a system memory 710. System memory 710 may store program instructions that are loadable and executable on processing unit 704, as well as data generated during the execution of these programs.

Depending on the configuration and type of computer system 700, system memory 710 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 704. In some implementations, system memory 710 may include multiple different types of memory, such as static random access memory (SRAM) or dynamic random access memory (DRAM). In some implementations, a basic input/output system (BIOS), containing the basic routines that help to transfer information between elements within computer system 700, such as during start-up, may typically be stored in the ROM. By way of example, and not limitation, system memory 710 also illustrates application programs 712, which may include client applications, Web browsers, mid-tier applications, relational database management systems (RDBMS), etc., program data 714, and an operating system 716. By way of example, operating system 716 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 718 may also provide a tangible computer-readable storage medium for storing the basic programming and data constructs that provide the functionality of some embodiments. Software (programs, code modules, instructions) that when executed by a processor provide the functionality described above may be stored in storage subsystem 718. These software modules or instructions may be executed by processing unit 704. Storage subsystem 718 may also provide a repository for storing data used in accordance with the present invention.

Storage subsystem 700 may also include a computer-readable storage media reader 720 that can further be connected to computer-readable storage media 722. Together and, optionally, in combination with system memory 710, computer-readable storage media 722 may comprehensively represent remote, local, fixed, and/or removable storage devices plus storage media for temporarily and/or more permanently containing, storing, transmitting, and retrieving computer-readable information.

Computer-readable storage media 722 containing code, or portions of code, can also include any appropriate media known or used in the art, including storage media and communication media, such as but not limited to, volatile and non-volatile, removable and non-removable media implemented in any method or technology for storage and/or transmission of information. This can include tangible, non-transitory computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. When specified, this can also include nontangible, transitory computer-readable media, such as data signals, data transmissions, or any other medium which can be used to transmit the desired information and which can be accessed by computing system 700.

By way of example, computer-readable storage media 722 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 722 may include, but is not limited to, Zip® drives, flash memory cards, universal serial bus (USB) flash drives, secure digital (SD) cards, DVD disks, digital video tape, and the like. Computer-readable storage media 722 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 700.

Communications subsystem 724 provides an interface to other computer systems and networks. Communications subsystem 724 serves as an interface for receiving data from and transmitting data to other systems from computer system 700. For example, communications subsystem 724 may enable computer system 700 to connect to one or more devices via the Internet. In some embodiments communications subsystem 724 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some embodiments communications subsystem 724 can provide wired network connectivity (e.g., Ethernet) in addition to or instead of a wireless interface.

In some embodiments, communications subsystem 724 may also receive input communication in the form of structured and/or unstructured data feeds 726, event streams 728, event updates 730, and the like on behalf of one or more users who may use computer system 700.

By way of example, communications subsystem 724 may be configured to receive data feeds 726 in real-time from users of social media networks and/or other communication services such as Twitter® feeds, Facebook® updates, web feeds such as Rich Site Summary (RSS) feeds, and/or real-time updates from one or more third party information sources.

Additionally, communications subsystem 724 may also be configured to receive data in the form of continuous data streams, which may include event streams 728 of real-time events and/or event updates 730, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 724 may also be configured to output the structured and/or unstructured data feeds 726, event streams 728, event updates 730, and the like to one or more databases that may be in communication with one or more streaming data source computers coupled to computer system 700.

Computer system 700 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 700 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A method for generating entropy in a computing device, the method comprising:
    setting a repeating first timer for a first frequency;
    setting a repeating second timer for a second frequency;
    collecting first bits from a first entropy source at the first frequency into a first accumulation buffer of a predetermined size, the predetermined size based on an amount of entropy per bit attributable to the first entropy source;
    accepting the first bits into the first accumulation buffer;
    presenting the first bits from the first accumulation buffer to a pseudo-random number generator as a first seed upon the first accumulation buffer becoming full;
    gathering a specified number of second bits from a second entropy source at the second frequency, the specified number based on an amount of entropy per bit attributable to the second entropy source; and
    presenting the second bits to the pseudo-random number generator as a second seed,
    whereby the first and second bits can be used to seed the pseudo-random number generator.

2. The method of claim 1 further comprising:
    periodically adjusting the first frequency.

3. The method of claim 2 wherein the adjusting of the first frequency is based on an output from the pseudo-random number generator.

4. The method of claim 2 wherein the adjusting includes adding or subtracting up to 5% of the first frequency.

5. The method of claim 2 wherein the periodicity of first frequency adjustment is randomized.

6. The method of claim 2 wherein the periodicity of first frequency adjustment is within a range of 5 seconds to 60 seconds.

7. The method of claim 2 further comprising:
    periodically adjusting the second frequency based on an output from the pseudo-random number generator.

8. The method of claim 1 further comprising:
    calculating a Hamming distance between successive collected first bits; and
    accepting the collected first bits into the first accumulation buffer based on the calculated Hamming distance exceeding a minimum.

9. The method of claim 1 further comprising:
summing Hamming distances between successive collections of first bits into an accumulated value of entropy attributed to contents of the first accumulation buffer; and
providing the accumulated value of entropy to the pseudo-random number generator.

10. The method of claim 1 further comprising:
emptying the first accumulation buffer before a subsequent collection.

11. The method of claim 1 further comprising:
accepting the second bits into a second accumulation buffer upon the gathering, the second accumulation buffer having a different size than a size of the first accumulation buffer; and
presenting the second bits from the second accumulation buffer to the pseudo-random number generator upon the second accumulation buffer becoming full.

12. The method of claim 1 wherein first or second frequency is selected from the group consisting of once per 0.1287 seconds, 0.13 seconds, 0.1370 seconds, 0.15 seconds, 0.25 seconds, 0.715 seconds, 0.751 seconds, 0.753 seconds, 1.13 seconds, 1.27 seconds, 1.6626 seconds, 2 seconds, 2.222 seconds, 2.2427 seconds, 4.4 seconds, 4.9 seconds, 5.9 seconds, 9.81 seconds, 10.000 seconds, 11.913 seconds, and 15 seconds.

13. The method of claim 1 wherein the first or second entropy source is selected from the group consisting of: instantaneous or accumulated central processing unit (CPU) usage; physical or virtual memory usage; network traffic volume; least significant time values of a high resolution clock; an input/output (TO) statistic; an Intel x86 RDRAND instruction; an Intel x86 RDSEED instruction; an Intel Itanium ar.itc register; a UNIX or Linux /dev/random file; a UNIX or Linux /dev/urandom file; an OpenBSD, Solaris, or Linux getentropy system call; a Solaris or Linux getrandom system call; a Microsoft Windows CryptGenRandom function; a Linux /proc/diskstats file; a Linux /proc/interrupts file; a Linux /proc/meminfo file; a Linux /proc/net/dev file; a Linux /proc/timer_list file; a Linux/S390 /dev/prandom file; a BSD Unix /dev/srandom file; a Microsoft Windows win_processes module; and a user interface information source.

14. The method of claim 1 further comprising:
generating a random number through the pseudo-random number generator based on the first bits or second bits.

15. The method of claim 1 wherein the setting of the first timer or the second timer includes making a system call.

16. The method of claim 1 wherein the collecting of the first bits and the gathering of the specified number of second bits occur upon firing events of the respective timers.

17. The method of claim 1 wherein the pseudo-random number generator is configured to generate numbers, characters, and other symbols.

18. A non-transitory computer-readable medium for generating entropy in a computing device, comprising instructions stored thereon, that when executed on a processor, perform the steps of:
setting a repeating first timer for a first frequency;
setting a repeating second timer for a second frequency;
collecting first bits from a first entropy source at the first frequency into a first accumulation buffer of a predetermined size, the predetermined size based on an amount of entropy per bit attributable to the first entropy source;
accepting the first bits into the first accumulation buffer;
presenting the first bits from the first accumulation buffer to a pseudo-random number generator as a first seed upon the first accumulation buffer becoming full;
gathering a specified number of second bits from a second entropy source at the second frequency, the specified number based on an amount of entropy per bit attributable to the second entropy source; and
presenting the second bits to the pseudo-random number generator as a second seed,
whereby the first and second bits can be used to seed the pseudo-random number generator.

19. The medium of claim 18 wherein the steps further comprise:
periodically adjusting the first frequency.

20. A system for generating entropy in a computing device, the system comprising:
a memory; and
at least one processor operatively coupled to the memory and executing program coded from the memory comprising:
program code for setting a repeating first timer for a first frequency;
program code for setting a repeating second timer for a second frequency;
program code for collecting first bits from a first entropy source at the first frequency into a first accumulation buffer of a predetermined size, the predetermined size based on an amount of entropy per bit attributable to the first entropy source;
program code for accepting the first bits into the first accumulation buffer;
program code for presenting the first bits from the first accumulation buffer to a pseudo-random number generator as a first seed upon the first accumulation buffer becoming full;
program code for gathering a specified number of second bits from a second entropy source at the second frequency, the specified number based on an amount of entropy per bit attributable to the second entropy source; and
program code for presenting the second bits to the pseudo-random number generator as a second seed,
whereby the first and second bits can be used to seed the pseudo-random number generator.

* * * * *

UNITED STATES PATENT AND TRADEMARK OFFICE
CERTIFICATE OF CORRECTION

PATENT NO. : 10,489,118 B2
APPLICATION NO. : 16/164720
DATED : November 26, 2019
INVENTOR(S) : Dale et al.

Page 1 of 2

It is certified that error appears in the above-identified patent and that said Letters Patent is hereby corrected as shown below:

On the Title Page

On page 2, Column 1, under Other Publications, Line 9, delete "Unesix" and insert -- Usenix --, therefor.

In the Specification

In Column 5, Line 47, delete "The" and insert -- the --, therefor.

In Column 11, Line 52, delete "demon" and insert -- daemon --, therefor.

In Column 14, Line 44, delete "if sufficient." and insert -- if_sufficient. --, therefor.

In Column 19, Line 52, delete "entropy query verbose(" and insert -- entropy_query_verbose( --, therefor.

In Column 19, Line 53, delete "entropy set verbose(" and insert -- entropy_set_verbose( --, therefor.

In Column 24, Line 2, delete "demons" and insert -- daemons --, therefor.

In Column 24, Line 4, delete "demons" and insert -- daemons --, therefor.

In Column 33, Line 6, delete "GlobalMemory Status" and insert -- GlobalMemoryStatus --, therefor.

In Column 35, Line 9, delete "demon," and insert -- daemon, --, therefor.

In Column 35, Line 10, delete "demon" and insert -- daemon --, therefor.

In Column 35, Line 21, delete "demon," and insert -- daemon, --, therefor.

Signed and Sealed this
Sixteenth Day of February, 2021

Drew Hirshfeld
*Performing the Functions and Duties of the*
*Under Secretary of Commerce for Intellectual Property and*
*Director of the United States Patent and Trademark Office*

In Column 35, Line 47, delete "demon," and insert -- daemon, --, therefor.

In Column 35, Line 50, delete "100 s" and insert -- 100 μs --, therefor.

In Column 35, Line 53, delete "demon" and insert -- daemon --, therefor.

In the Claims

In Column 43, Line 33, in Claim 13, delete "(TO)" and insert -- (IO) --, therefor.